(12) United States Patent
Rieker

(10) Patent No.: US 12,384,131 B2
(45) Date of Patent: Aug. 12, 2025

(54) METALLIZED PACKAGING FILMS FROM RECYCLED PLASTICS

(71) Applicant: KBG Kunststoff Beteiligungen GmbH, Plettenberg (DE)

(72) Inventor: Frank Rieker, Plettenberg (DE)

(73) Assignee: KBG Kunststoff Beteiligungen GmbH (DE)

( * ) Notice: Subject to any disclaimer, the term of this patent is extended or adjusted under 35 U.S.C. 154(b) by 374 days.

(21) Appl. No.: 17/916,756

(22) PCT Filed: Jan. 5, 2021

(86) PCT No.: PCT/EP2021/050060
§ 371 (c)(1),
(2) Date: Oct. 3, 2022

(87) PCT Pub. No.: WO2021/197674
PCT Pub. Date: Oct. 7, 2021

(65) Prior Publication Data
US 2023/0150234 A1    May 18, 2023

(30) Foreign Application Priority Data

Apr. 3, 2020 (DE) .................... 10 2020 109 370.5
Apr. 23, 2020 (DE) .................... 10 2020 111 086.3

(51) Int. Cl.
*B32B 7/02*        (2019.01)
*B32B 27/08*       (2006.01)
(Continued)

(52) U.S. Cl.
CPC ............... *B32B 7/02* (2013.01); *B32B 27/08* (2013.01); *B32B 27/20* (2013.01); *B32B 27/32* (2013.01);
(Continued)

(58) Field of Classification Search
CPC ........... B32B 7/02; B32B 27/08; B32B 27/20; B32B 27/32; B32B 2250/242;
(Continued)

(56) References Cited

FOREIGN PATENT DOCUMENTS

| EP | 0653454 | 5/1995 | |
| WO | WO-2019182017 A1 * | 9/2019 | ............ B32B 27/08 |

OTHER PUBLICATIONS

Aono et al. (WO 2019/182017 A1); Sep. 26, 2019 (EPO—machine translation to English). (Year: 2019).*

* cited by examiner

*Primary Examiner* — Donald M Flores, Jr.
(74) *Attorney, Agent, or Firm* — Edward E. Sowers; Brannon Sowers & Cracraft PC

(57) ABSTRACT

The invention relates to a multilayer plastic film, in particular a multilayer plastic composite film, preferably a multilayer plastic packaging film, based on plastic recyclate (recycled plastic), in particular based on plastic recyclate originating from waste, with a plastic recyclate content of at least 80 wt. %, based on the plastic film, and with barrier layer properties (barrier properties) to water vapor and/or gases (preferably oxygen), preferably with barrier layer properties (barrier properties) to water vapor and gases (preferably oxygen), and the use of this multilayer plastic film, in particular as packaging material. The plastic recyclate is preferably post-consumer plastic recyclate (PCR plastic recyclate), in particular PCR recycled films.

26 Claims, 1 Drawing Sheet

(51) Int. Cl.
 *B32B 27/20* (2006.01)
 *B32B 27/32* (2006.01)
(52) U.S. Cl.
 CPC ..... *B32B 2250/242* (2013.01); *B32B 2250/40* (2013.01); *B32B 2255/10* (2013.01); *B32B 2255/205* (2013.01); *B32B 2272/00* (2013.01); *B32B 2307/7246* (2013.01); *B32B 2307/732* (2013.01); *B32B 2439/46* (2013.01); *Y10T 428/1334* (2015.01); *Y10T 428/1338* (2015.01); *Y10T 428/1352* (2015.01); *Y10T 428/1355* (2015.01); *Y10T 428/1359* (2015.01); *Y10T 428/26* (2015.01)
(58) Field of Classification Search
 CPC ............ B32B 2250/40; B32B 2255/10; B32B 2255/205; B32B 2272/00; B32B 2307/7246; B32B 2307/732; B32B 2439/46; B32B 1/08; B32B 2307/41; B32B 2307/412; B32B 2250/03; Y10T 428/1334; Y10T 428/1338; Y10T 428/1352; Y10T 428/1355; Y10T 428/1359; Y10T 428/26; Y02W 30/62
 See application file for complete search history.

METALLIZED PACKAGING FILMS FROM RECYCLED PLASTICS

CROSS-REFERENCES TO RELATED APPLICATIONS

This application is a National Stage filing of International Application PCT/EP 2021/050060 filed Jan. 5, 2021, entitled "Metallized Packaging Films Made From Recycled Plastics" claiming priority to DE 10 2020 109 370.5 filed Apr. 3, 2020, and DE 10 2020 111 086.3 filed Apr. 23, 2020. The subject application claims priority to PCT/EP 2021/050060, DE 10 2020 109 370.5, and DE 10 2020 111 086.3 and incorporates all by reference herein, in their entirety.

BACKGROUND OF THE INVENTION

The present invention relates to the field of waste recycling, in particular the recycling (recycling) of plastic waste, in particular for the production of plastic films, in particular packaging films, based on plastic recyclate (preferably plastic recyclate in the form of so-called post-consumer plastic recyclate, synonymously also referred to as PCR plastic recyclate, in particular plastic recyclate in the form of PCR recycled films), wherein the plastic films additionally have barrier layer properties (i.e. barrier properties), in particular against water vapor and/or gases (preferably oxygen), preferably against water vapor and gases (preferably oxygen).

In particular, the present invention relates to a multilayer plastic film, in particular a multilayer plastic composite film, preferably a multilayer plastic packaging film, based on plastic recyclate (recycled plastic), in particular based on plastic recyclate originating from waste (preferably plastic recyclate in the form of so-called post-consumer plastic recyclate, synonymously also referred to as PCR plastic recyclate, in particular plastic recyclate in the form of PCR recycled films), the plastic film also having barrier layer properties (i.e., barrier properties), in particular with respect to water vapor and/or gases (preferably oxygen), preferably with respect to water vapor and gases (preferably oxygen).

Furthermore, the present invention relates to the use of a multilayer plastic film according to the present invention for the production of packaging material and/or as packaging material.

Finally, the present invention relates to a packaging material comprising at least one multilayer plastic film according to the present invention.

In Germany, approximately 2.5 million tons of packaging waste or plastic waste (plastic waste) are generated annually, with a large part of this being stored in landfills or thermally disposed of in waste incineration plants. For the manufacture of products based on plastics (also synonymously referred to as "plastics"), mainly newly produced plastics (so-called "virgin materials" or "primary plastics") are used from mostly fossil raw materials (such as crude oil, natural gas, coal, etc.); i. e. no plastic waste or recycled plastics are usually used to manufacture such plastic-based products, but mainly virgin or primary plastics produced from finite natural raw materials, such as petroleum, coal or natural gas, by chemical synthesis processes.

Moreover, old plastics cannot be converted back into their original materials by biological degradation processes or otherwise, so that the earth's raw material reserves are significantly reduced by the constant new production of plastics, which is why reuse or recycling (recycling) is becoming increasingly important in society. Also, the constantly increasing amount of waste, especially plastic-based waste, can no longer be easily stored or disposed of in any other way, so that recycling is also necessary due to the resulting environmental pollution.

The term "recycling" or "recycling processes" (synonymously also "recycling" or "recycling processes") refers in particular to those procedures or processes in which raw materials are recovered from waste, which in turn are fed back into the economic cycle, in particular are processed into new products; these processes are also referred to as material recycling. Such processes significantly reduce the quantities of waste generated, in particular the quantities of waste that would otherwise have to be incinerated or landfilled, while at the same time conserving the earth's finite reserves of raw materials. In this context, it should be noted that the term "recycling" refers to the (re)recovery of neurohazardous materials from actual waste, but not, for example, the reuse or further use of production residues. In particular, the plastic waste to be recycled may, for example, be films or packaging that has already been used by third parties and has been returned to the end customer.

In this context, the term recycling stands in particular for reuse or reprocessing and describes in particular a recovery process by which plastic-based waste (plastic waste) is reprocessed into products, materials or substances either for the original purpose or for other purposes (cf. also Section 3 (25) of the German Closed Substance Cycle Waste Management Act). The term thus also includes, in particular, the processing of organic materials, but not energy recovery and processing into materials intended for use as fuel or for backfilling.

In this context, the term recyclates refers in particular to secondary materials as a basis for the manufacture of (quality) new products, i.e. recycled plastics from plastic-based waste (plastic waste), especially from so-called post-consumer waste.

The term "reclaims", on the other hand, which is to be distinguished from "recyclates", refers in particular to quantities of material that originate from internal production waste and can be fed directly back into the manufacturing process, usually after suitable comminution. Such materials are therefore not to be subsumed under the term recyclates.

In particular, so-called post-consumer recycling (PCR) refers to the reprocessing of so-called post-consumer waste, i.e. plastic waste generated by consumers, especially in households, offices and the stationary trade.

The recycling of plastic waste has been facilitated in Germany in particular since 1990 by the introduction of separate waste collection (dual waste collection and recycling system or "Green Dot"), which means that pre-sorting by the consumer already takes place. This is because the waste or waste material must be as pure as possible in order to be reused in new production.

In the recycling process, the waste that is still unclean despite initial pre-separation or pre-sorting by the consumer must then be further sorted or separated. In the case of plastic-based waste (plastic waste), for example, there is an indeterminate mixture of a large number of different types of plastic. In this context, a number of processes are known, some of them automated, which further sort the plastic waste either by color or by other physic-chemical properties (for example, by means of laser or infrared technology, density determination, etc.) in order to increase the grade purity of the respective type of plastic as far as possible, since mutually incompatible types of plastic cannot easily be fed for further processing into a new valuable material or product.

The objective of such a recycling process for plastic waste is to obtain plastic waste material that is as pure as possible in terms of type (i.e. pure in terms of plastic type), since only such plastic waste material that is pure in terms of type can be processed into a high-quality plastic recyclate for further processing into plastic products. For this purpose, the plastic waste is usually melted or sintered, in particular within the scope of extrusion, injection molding, injection compression molding, sinter compression molding, intrusion processes, etc., which is why only plastics that are compatible with each other and of the same type can be processed in this way. The term grade purity (i.e. plastic grade purity) refers in particular to identical plastics or identical plastic grades with identical labeling (i.e. labeling according to DIN EN ISO 11469 and/or according to VDA standard 260). The (plastic) grade-specific identification and labeling carried out in the DIN EN ISO 11469 (2017) standard uses the identification letters and abbreviations according to DIN EN ISO 1043 (2016) in each case for the designation of the respective plastic grade, the latter designating the plastic base polymers (e.g. PE for polyethylene, PP for polypropylene, PET for polyethylene terephthalate, etc.). Within a (single) type of plastic, further subdivisions or subclassifications may be made, but there is still only one type of plastic within the meaning of DIN EN ISO 11469 and/or VDA Standard 260 (e.g. subdivision or subclassification in the case of polyethylene, e.g. LDPE, LLDPE, HDPE, etc.); the same also applies to different molecular weights within a single type of plastic.

In this context, the plastic-based waste (plastic waste) pre-sorted by the consumer is further sorted, shredded and then, if necessary, further sorted and washed. Then the pre-sorted and cleaned waste, which is as pure as possible, is further processed into plastic recyclates, in particular in granulation, extrusion, injection molding, compression molding, sintering, intrusion processes, etc. Only the plastic recyclate obtained in this way can be used again in the production of new plastic products.

However, even in the case of unmixed plastic waste or recycled plastics, reuse, especially in the manufacture of new plastic products, is not always possible without further ado, since the impurities still contained therein (e.g. undesirable odorous substances, fats and oils, metals and heavy metals, foreign bodies such as wood, paper and cardboard, etc.) can impair the end product to be manufactured.

In addition, however, the reuse or recycling of unsorted plastics has also been considered: For example, the European patent specification EP 0 906 365 B1 describes a process that recycles unsorted plastic waste, whereby in this context a carrier material made of another material, such as wood, paper, cardboard, bulky waste, etc., is necessary and thus a multi-layered product made of different types of materials is formed overall. This is particularly problematic, since such mixed products of different kinds of materials cannot be recycled again, since a separation of the different kinds of materials cannot or at least not easily be carried out; such a process thus only allows a one-time recycling of unsorted plastic waste, whereby a renewed recycling, however, is no longer possible.

In this connection, comparable processes are also known which process unmixed plastic waste in combination with other foreign substances, in particular fillers or carrier substances (cf. e.g. DE 698 15 401 T2, EP 2 937 199 B1 and DE 37 15 646 A1), so that—as mentioned above—no renewed recycling is possible with regard to such mixed products from a large number of different materials.

Furthermore, the use or recycling of unmixed plastic waste for new production (i.e. for the production of new plastic-based products) is also known, although in this context significant amounts of virgin plastics usually have to be added to ensure the required qualities, as described for example in WO 92/15640 A1.

Consequently, the prior art still lacks possibilities to recycle plastic waste in such a way that high-performance plastic-based virgin materials can be provided or produced, which consist at least substantially or essentially exclusively of the respective plastic recyclates obtained from the plastic waste. Furthermore, the prior art also lacks the ability to provide such virgin plastics that consist substantially or essentially of plastic waste that can be recycled again so that a long-term and sustainable economic cycle is formed.

However, even the production of plastic films according to the state of the art using partially recycled single-variety plastic waste with addition of significant amounts of virgin plastics (cf. e.g. previously discussed WO 92/15640 A1) does not result in plastic films that also exhibit so-called barrier layer properties (i.e. barrier properties) against water vapor and oxygen. However, such barrier layer properties of plastic films are often required, in particular for the packaging of moisture-sensitive, oxygen-sensitive and/or odor-releasing products (such as detergent powders, etc., which would be impaired as a result of the penetration of water vapor or moisture, e.g. by clumping, and at the same time release undesirable substances, e.g. fragrances).

According to the state of the art, multilayer films or composite films with different film layers based on different types of plastic are usually used to provide plastic films with barrier layer properties (i.e. barrier properties) against water vapor and oxygen. In particular, film laminates or composite films (multilayer films) with polyester film layer(s) on the one hand and polyethylene film layer(s) on the other are to be mentioned here, with the polyester film layer(s) providing barrier properties against water vapor and oxygen and the polyethylene film layer(s) providing sealability.

A particular problem with such multilayer or composite films (e.g. polyester/polyethylene composite films) is that they are not recyclable, since mixed plastic types or grades (namely polyester on the one hand and polyethylene on the other) are present.

Therefore, in particular for economic, environmental and social reasons, it is not only desirable but rather necessary to use plastic waste for the new production of plastic-based products, whereby in this context—in order to enable a sustainable economic cycle—the end properties of the products manufactured using plastic waste should not deteriorate, at least in essence, compared to corresponding products manufactured from primary plastics.

BRIEF SUMMARY OF THE INVENTION

The object underlying the present invention therefore consists in the provision of plastic films, in particular packaging films, based on recycled plastic, whereby the disadvantages of the prior art described above are to be at least largely avoided or at least mitigated.

In particular, such plastic films, especially packaging films, based on plastic recyclate are to be provided, which are at least substantially formed of or consist of materials recycled from plastic waste (i.e. plastic recyclate) and at the same time have barrier layer properties (i.e. barrier properties), especially against water vapor and/or gases (preferably oxygen), preferably against water vapor and gases (preferably oxygen).

In particular, a further object underlying the present invention is the provision of plastic films, in particular packaging films, based on recycled plastics, which have at least essentially the same properties or at most only slightly or insignificantly worse properties (e.g. mechanical and/or optical and/or haptic etc. properties) as plastic films based on primary plastics and at the same time have barrier layer properties (i.e. barrier properties), in particular against water vapor and/or gases (preferably oxygen), preferably against water vapor and gases (preferably oxygen).

Furthermore, a further object underlying the present invention consists in particular in the provision of such plastic films, in particular packaging films, based on plastic recyclate, which consist substantially of a (single or uniform) material, in particular of a (single or uniform) type of plastic, and at the same time exhibit barrier layer properties (i.e. barrier properties), in particular with respect to water vapor and/or gases (preferably oxygen), preferably with respect to water vapor and gases (preferably oxygen). In particular, the plastic films should not be products made of a plurality of different types of materials (e.g., different types of plastic).

In addition, a further object underlying the present invention is the provision of plastic films, in—particular packaging films, based on plastic recyclate and exhibiting barrier layer properties (i.e. barrier properties), in particular to water vapor and/or gases (preferably oxygen), preferably to water vapor and gases (preferably oxygen), which films can be processed automatically or in automated filling and/or packaging systems (e.g. FFS or VFFS systems).

Finally, the object is to provide plastic films, in particular packaging films, based on recycled plastic, which are suitable for a renewed recycling process and at the same time exhibit barrier layer properties (i.e. barrier properties), in particular against water vapor and/or gases (preferably oxygen), preferably against water vapor and gases (preferably oxygen).

In a completely surprising way, the applicant has now found out that in particular multilayer plastic films, in particular plastic composite films, preferably plastic packaging films, based on plastic recyclate (recycled plastic), in particular based on plastic recyclate originating from waste, are suitable for solving the problems and tasks described above, which are formed from several interconnected film layers and have a plastic recyclate content of at least 80% by weight, based on the plastic film, and also have an additional metal layer (which provides the desired barrier layer properties).

To solve the object described above, the present invention therefore proposes—according to a first aspect of the present invention—a multilayer plastic film with barrier layer properties against water vapor and/or gases, in particular multilayer plastic composite film, preferably multilayer plastic packaging film, based on plastic recyclate (recycled plastic), in particular based on plastic recyclate originating from waste; further, in particular special and/or advantageous embodiments of the process according to the invention are also described.

Furthermore, the present invention relates—according to a second aspect of the present invention—to the use of a multilayer plastic film according to the present invention for the production of packaging material and/or as packaging material; further, in particular special and/or advantageous embodiments of this aspect of the invention are similarly disclosed.

Similarly, the present invention relates—according to a third aspect of the present invention—to a packaging material according to the present invention, comprising at least one multilayer plastic film according to the present invention; further and/or advantageous embodiments of this aspect of the invention are also disclosed.

It is self-evident from the following explanations that designs, embodiments, advantages and the like, which are set out below for the purpose of avoiding repetition in respect of only one aspect of the invention, naturally also apply accordingly in respect of the other aspects of the invention, without this requiring separate mention.

Furthermore, it goes without saying that individual aspects and embodiments of the present invention are also considered disclosed in any combination with other aspects and embodiments of the present invention and, in particular, any combination of features and embodiments as resulting from the back references of all patent claims is also considered extensively disclosed with respect to all resulting possible combinations.

In the case of all relative or percentage weight-related data mentioned below, in particular relative quantity or weight data, it should furthermore be noted that these are to be selected by the skilled person within the scope of the present invention in such a way that they always add up or add up to 100% or 100% by weight in total, taking into account all components or ingredients, in particular as defined below; however, this is self-evident for the skilled person.

In all other respects, the person skilled in the art can deviate from the following range specifications, if necessary, without departing from the scope of the present invention, either in relation to the application or in individual cases.

In addition, it applies that all values or parameters or the like mentioned in the following can basically be determined with standardized or explicitly specified determination methods or otherwise with determination or measurement methods familiar to the skilled person in this field.

Having said this, the present invention will now be explained in detail below.

DETAILED DESCRIPTION OF THE INVENTION

Figure 1:
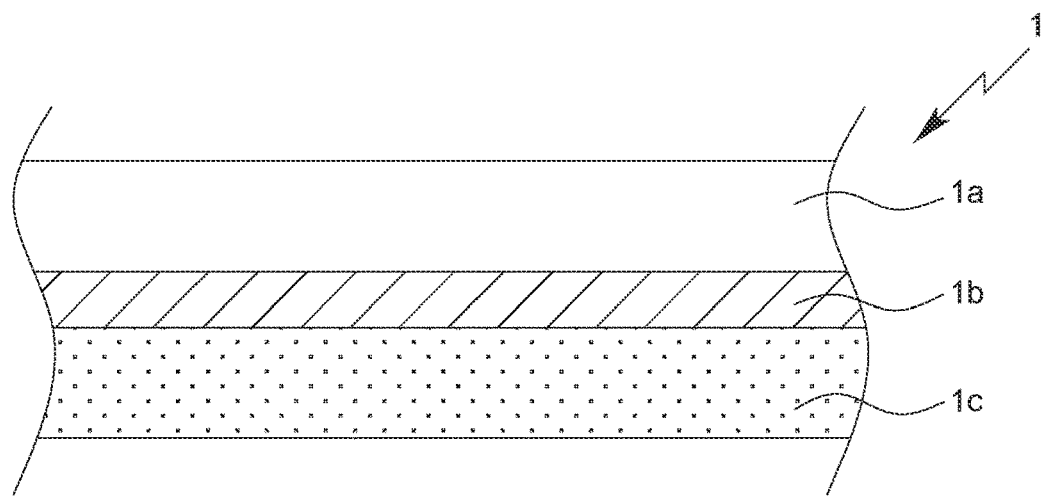
FIG. 1 provides a schematic cross-sectional view of a multilayer plastic film according to a particular embodiment of the present invention, in which the two outer films are each single-layered or single-layered.

Thus, the object of the present invention—according to a first aspect of the present invention—is a multilayer plastic film, in particular multilayer plastic composite film, preferably multilayer plastic packaging film, based on recycled plastic (recycled plastic), in particular based on recycled plastic derived from waste, and having barrier layer properties (=barrier properties) to water vapor and/or gases (preferably oxygen), preferably having barrier layer properties (barrier properties) to water vapor and gases (preferably oxygen),
wherein the plastic film comprises a laminate of several, in particular at least three, layers bonded together,
wherein the plastic film and/or the laminate comprises a first outer film (=carrier film) and a second outer film (=laminating or cover film) and a metal layer arranged between the first outer film and the second outer film,
wherein the plastic film has a plastic recyclate content of at least 80 wt.-%, based on the plastic film.

As explained above, the applicant has found out quite surprisingly that in this way it is possible to provide a plastic film based on plastic recyclate derived from waste with a plastic recyclate content of at least 80% by weight, based on the plastic film, which on the one hand has at least essentially equivalent or at most slightly or insignificantly worse properties (e.g. mechanical or optical or haptic properties etc.) than plastic films based on primary plastics and on the other hand has equally barrier layer properties (=barrier properties against water vapor and/or gases) to water vapor and/or gases (preferably oxygen), preferably with barrier layer properties (barrier properties) to water vapor and gases (preferably oxygen).

The result according to the invention is a plastic film which is itself recyclable and which is designed as a film composite based on recycled plastic (in particular polyethylene recyclate) with a recycled content of at least 80% and which, due to the metal layer (in particular metallization), has barrier properties, in particular against water vapor and oxygen. The metal content of the plastic film resulting from the metal layer is so low that the plastic film according to the invention can be recycled as such or independently (especially since the metal layer can be separated during the recycling process without additional measures or process steps in the course of conventional plastic recyclate processing).

With the concept according to the invention, it is possible, on the one hand, to meet the increased requirements of environmental protection, in particular ecological compatibility, with regard to the production of plastic films due to the use of recycled plastic, and, on the other hand, to nevertheless provide high-performance plastic films which, with regard to their performance, are comparable with plastic films produced from primary plastics. The plastic films according to the invention also combine the diametrical requirements often placed on plastic films, namely in terms of sealability on the one hand and barrier layer properties (in particular with respect to water vapor or atmospheric moisture and/or gases, in particular oxygen) on the other hand.

Based on the concept according to the invention, the aforementioned barrier layer properties can be achieved although plastic recyclate of a single type of plastic is used (whereas the prior art, as described above, has to combine different types of plastic, such as polyethylene and polyester, in different film layers in order to achieve the required sealability with simultaneous barrier effect). Consequently, the plastic films according to the invention are recyclable as such or independently and can in this way be returned to the value-added cycle after use. As described above, the generally very thin metal layer does not prevent recycling, but nevertheless ensures reliable barrier properties.

In addition, the plastic films according to the invention are characterized by a large number of further advantages and special features, as described below, although the following description does not claim to be exhaustive.

In particular, the applicant has surprisingly found that under these conditions, high performance plastic films can be provided despite the very high recycled plastic content.

In particular, the plastic films according to the invention are formed or consist at least substantially of materials or plastic recyclate recycled from plastic waste. At the same time, it is possible to subject the plastic films according to the invention, in particular packaging films, based on plastic recyclate, which consist substantially of a single or uniform plastic material (i.e., at least substantially of a single or uniform type of plastic), to renewed recycling after their use or to introduce them into a renewed recycling process, in order ultimately to obtain new plastic recyclate therefrom again. In other words, the plastic films according to the invention are themselves recyclable or recyclable (recyclable) again.

The term "recyclate" or "plastic recyclate", as used in accordance with the invention, refers in particular to those plastics which are provided from plastic-based waste by recycling, i.e. in particular separation according to type of plastic, cleaning and comminution. In this context, in particular such wastes can be used as are, for example, already pre-sorted by the consumer in the household in the "Green Dot" system and are preferably disposed of in the yellow bag or the yellow garbage can. These materials are mostly subjected to a washing process (cf. also above and still following explanations).

In particular, in the context of the present invention, a plastic recyclate in the form of so-called post-consumer plastic recyclate, synonymously also referred to as PCR plastic recyclate, in particular plastic recyclate in the form of PCR recycled films, can be used as the plastic recyclate. The plastic film then obtained according to the invention is consequently a so-called PCR plastic film (post-consumer recycled plastic film).

The term of grade purity as used according to the invention refers to the plastic grade purity, i.e. according to the invention, the term of grade purity means in particular that at least substantially only one (single) plastic grade or only identical plastics/plastic grades are present. In this context, identical plastic grades are those plastics that have the same identification according to DIN EN ISO 11469 and/or VDA standard 260 (whereby in the DIN EN ISO 11469 (2017) standard, the plastic grade-specific identification and labelling for the designation of the respective plastic grades is based on the identification letters or abbreviations according to DIN EN ISO 1043 (2016)). In DIN EN ISO 1043, the plastic base polymers are designated by code letters or abbreviations (e.g. PE for polyethylene, PP for polypropylene, PET for polyethylene terephthalate, etc.) subclassification (e.g. subdivision or subclassification according to density, crosslinking, molecular weight, etc.), they nevertheless correspond to a single type of plastic within the meaning of DIN EN ISO 11469 or VDA standard 260 and thus within the meaning of the present invention.

Due to the particularly high recycled content of the plastic films according to the invention of at least 80% by weight, these plastic films are particularly resource-saving, since waste materials are used and in this way supplied to a new added value and consequently no or only very small quantities of new raw materials have to be extracted from fossil starting materials or raw materials (e.g. crude oil, coal, natural gas, etc.). Moreover, in this context there is a high energy efficiency with regard to the use of raw materials, in particular because the corresponding plastics do not have to be (newly) produced from the corresponding fossil starting materials/raw materials as so-called primary plastics, but rather already existing plastic materials are sorted or (separated) and purified according to their type of plastic, in order to then be able to be reused as plastic recyclate after further processing (e.g. comminution, processing into granulates, etc.). Overall, therefore, there is a high level of environmental compatibility with regard to the plastic films according to the invention, in particular a high level of compatibility with regard to environmental protection, in particular through resource or raw material savings or through resource and raw material management.

In a completely surprising way, the applicant has found out that the plastic films according to the present invention, despite a recycled content of at least 80% by weight, have at least similar or comparable performance properties compared to "new" plastic films (i.e., compared to plastic films made from primary plastics), namely similar or comparable performance properties, namely above all similar or comparable mechanical properties, but also similar or comparable other properties, e.g. optical properties, processing properties such as printability, sealability, etc., processability into packaging, tubes, bags, sacks, etc., processability in automated filling and/or packaging lines, in particular FFS or VFFS lines, etc.

Furthermore, the plastic films according to the invention based on plastic recyclate with a content of at least 80% by weight are at the same time at least substantially equal in price to "new" plastic films (i.e. plastic films which are produced using plastic primary materials).

Similarly, the plastic films according to the invention also help to reduce the quantities of plastic waste that are generated and would otherwise have to be disposed of, and to feed the plastic waste to an economically and ecologically efficient and compatible recycling or reuse.

In addition, the plastic films according to the invention not only have similar or comparable performance properties to primary plastic films, but can also be recycled again after use, thus enabling a closed-loop system. Such a closed-loop operation further increases the environmental compatibility of the plastic films according to the invention, in particular a long-lasting recycling or use of the underlying materials is possible without or only by minimal addition of new or primary plastics, so that fossil starting materials (i.e. the finite raw material reserves) can be sustainably protected or conserved.

In a completely surprising way, the applicant has found that the plastic film according to the invention based on at least 80% by weight of plastic recyclate has significantly improved properties, in particular with regard to application, adaptability and the mechanical properties, due to its formation in the form of a layer composite or as a layer composite in comparison with corresponding single-layer films (mono films).

In this context, the different layers of the multilayer plastic film according to the invention—although the individual layers, in particular the outer layers, are each based on the same type of recycled plastic—can be equipped with different properties (cf. the following explanations). Due to the different properties of the individual layers of the multilayer plastic film according to the invention, it is possible to adapt or tailor the overall properties of the multilayer plastic film (for example, the optical properties by coloring and/or homogenization over the film composite, or mechanical properties, the sealability or sealability, etc.), since the individual layers can be formed with different properties (e.g. with different thicknesses, different ingredients, such as additives, pigments, etc.) and the individual layers can thus each make a different contribution within the layer composite.

Furthermore, by forming the plastic films according to the invention in the form of a layer composite, it is possible for the two outer sides to be colored differently, which is advantageous depending on the desired application or use. It is also possible, for example, to equip the two outer plastic films and the inner and outer sides of the film in question with different properties, e.g. surface properties, such as roughness in particular (e.g. printability of one film surface, non-stick protection of another film surface, etc.).

In this context, improved optical properties can be provided, particularly in the case of opaque films, since inhomogeneities, which can be caused, for example, by impurities remaining in the recycled plastic (e.g. foreign substances such as metal particles, wood particles, oils, plastic particles, etc.), can be evened out or leveled over the various layers. This equalization or leveling can be achieved, among other things, by using different color pigments in the individual or different layers. Furthermore, improved degrees of opacity can also be achieved, which may be particularly important or necessary for preventing the formation of algae and germs in the case of packaged organic materials, or an improved visual protection for packaged goods can be provided in this way.

In addition, the applicant has surprisingly found that the multilayer structure, in particular with different properties and/or different further ingredients or additives in the respective individual layers, enables improved suppression of undesired migration of the ingredients (e.g. of UV stabilizers) or of impurities.

Furthermore, it is also possible to equip only a certain layer with necessary additives, as for example in the case of tubular films, where only the inner side can be equipped with an anti-adhesive or anti-blocking agent, such as chalk, to efficiently prevent blocking or sticking together of the inner layers lying on top of each other.

Overall, by forming the plastic film according to the invention in the form of a layer composite with identical overall layer thickness, improved mechanical properties, in particular better stability, tensile strength, elongation at break, puncture resistance, etc., and/or improved optical properties and/or improved further properties can be achieved compared to corresponding monolayers (i.e. in particular monolayers based on plastic recyclate). In addition, the plastic film according to the invention, which is formed as a layered composite, is more adaptable or tailorable with respect to the required or desired overall properties or application properties of the plastic film compared to corresponding mono films.

In addition, the present invention is characterized by other advantages as indicated below:

In particular, the high recyclate content, especially with high independent grade purity, of the plastic film according to the invention leads to particularly good independent recyclability.

The multilayer plastic film according to the invention can be universally processed, in particular the multilayer plastic film can be formed and used as a flat film and, if required, wound up, for example, into rolls for transport and/or processing, for example in the packaging industry. In addition, however, the multilayer plastic film according to the invention can also be processed or formed into a semi-tubular film or tubular film, or in the form of bags, pouches, etc.

In addition, the multilayer plastic film according to the invention can also be used universally. In particular, the multilayer plastic film according to the invention is suitable as a packaging material in the non-food sector, in particular for industrial packaging of, for example, bulk goods, (planting) soil, fertilizers, mulch, humus, etc., detergents, adhesives, pellets and granulates, household goods and merchandise, or for hygiene applications. In this context, the multilayer plastic film according to the invention is suitable for processing in known and common industrial and automated filling and/or packaging equipment (e.g. FFS or VFFS equipment or conventional converting equipment), so that no conversion is required for the use of the plastic films according to the invention. Consequently, conventional existing plants can be used overall.

In particular, the present invention makes it possible for the first time to provide plastic films, especially packaging films, based on plastic recyclate, which can be readily automated or processed in automated filling and/or packaging lines (e.g., in so-called FFS or VFFS lines [i.e., form-fill-seal lines or vertical form-fill-seal lines]).

Furthermore, as previously stated, the properties of the multilayer plastic film according to the invention are easily and efficiently adaptable or tailorable.

In particular, the multilayer plastic films according to the invention have very good film properties, especially good mechanical, optical, haptic and other properties.

In addition, the plastic films according to the invention are compatible with respect to other plastics, e.g. for bonding with other plastics.

The multilayer plastic film according to the invention can be further processed using conventional finishing processes, such as printing, coating, etc.

Furthermore, the applicant has surprisingly found out that by incorporating a metal layer into the plastic film according to the invention, even moisture-sensitive products and goods, especially powders, can be stored for a long time. In particular, storage of these products and goods is readily possible even in environments with high humidity.

In addition, the applicant has further surprisingly found that due to the presence of the metal layer in the plastic film according to the invention, products containing odor-releasing substances, such as washing powders, detergents and hygiene products, can also be stored for a long time, especially without any undesirable release of the odor-intensive substances.

The provision of a plastic film, in particular for use as packaging, in which moisture-sensitive and odor-intensive products can also be stored, in particular also for the long term, is only possible by the embodiment according to the invention, according to which a metal layer, in particular an aluminum layer, is arranged between two plastic films or plastic layers. Surprisingly, the applicant has found out in this context that the metal layer used according to the invention does not influence the recyclability of the plastic film per se.

The arrangement of the metal layer between the outer films also ensures that the metal layer is protected from wear and tear or damage, so that the barrier properties are not reduced even under mechanical stress.

Furthermore, the metal layer may or may not be visible to the consumer, depending in particular on the corresponding outer (plastic) films used (i.e. opaque or transparent plastic films).

In particular, the metallic layer can influence the optical properties and in this context, for example, foreground or accentuate the printing. Also, the metallic color of the metal layer can be integrated into the optical design. In this context, the exact color design of the metal layer can be influenced by the type of metals used and the layer thickness.

The barrier properties of the plastic film according to the invention can also be specifically adjusted or adapted or tailored by the metal layer, in particular by the layer thickness and the selection of the metal or metals.

A decisive advantage over the prior art, which usually uses a composite of several film layers made of different types of plastic to provide barrier properties, is that in the case of the present invention the composite between the metal layer and the outer plastic layers can be separated or detached again in the course of subsequent recycling, so that the recyclability of the plastic film according to the invention is in itself retained. In particular, the metal layer can be detached as part of the usual recycling processes without the need for a further or additional process step. In addition, the metal content in the overall film is so low that even metal remaining as contamination does not impair recycling.

Overall, plastic films can thus be provided within the scope of the present invention, which are formed from plastic-based waste materials and thus again form a product that is of value to the economic cycle and thus sustainable while conserving resources, which itself again exhibits a high degree of environmental compatibility, since it is independently recyclable or recyclable and furthermore exhibits high barrier properties, in particular with respect to water vapor and oxygen.

Preferred embodiments of the plastic film according to the invention are described and explained in more detail below:

As previously stated, the plastic film according to the present invention is a multilayer plastic film, in particular multilayer plastic composite film, preferably multilayer plastic packaging film, based on recycled plastic (recycled plastic), in particular based on recycled plastic derived from waste, and having barrier layer properties (=barrier properties) to water vapor and/or gases (preferably oxygen), preferably having barrier layer properties (barrier properties) to water vapor and gases (preferably oxygen), wherein the plastic film comprises a layer composite of several, in particular at least three, interconnected layers, wherein the plastic film and/or the layer composite comprises a first outer film (=carrier film) and a second outer film (=laminating or cover film) and a metal layer arranged between the first outer film and the second outer film, wherein the plastic film has a plastic recyclate content of at least 80% by weight, based on the plastic film.-%, based on the plastic film.

According to a particular embodiment of the present invention, the plastic recyclate has a (plastic) grade purity, in particular grade purity of the plastic grade according to DIN EN ISO 11469, of at least 90% by weight, in particular at least 95% by weight, based on the plastic recyclate.

With regard to the term grade purity or plastic grade purity mentioned above and below, this refers in particular to identical plastics or identical plastic grades with identical identification (i.e. identification according to DIN EN ISO 11469 and/or according to VDA standard 260). The (plastic) grade-specific identification or labeling carried out in the DIN EN ISO 11469 standard uses the code letters and abbreviations according to DIN EN ISO 1043 for the designation of the respective plastic grades, whereby the latter standard designates the plastic base polymers (e.g. PE for polyethylene, PP for polypropylene and PET for polyethylene terephthalate, etc.). Within a (single) plastic grade, further subdivisions or subclassifications can be made (e.g. according to molecular weight, density, etc.), but there is still only one plastic grade within the meaning of DIN EN ISO 11469 or VDA Standard 260 (e.g. subdivisions or subclassifications in the case of polyethylene: LDPE, LLDPE, HDPE, etc.). Also, in the sense of DIN EN ISO 11469 or VDA standard 260, there is a (single) plastic grade with different molecular weights within a previously defined plastic grade.

According to a further particular embodiment of the present invention, the plastic recyclate is designed to be at least substantially (plastic) grade-pure. In particular, the plastic recyclate has a (plastic) grade purity, in particular grade purity of the plastic grade according to DIN EN ISO 11469, of at least 90% by weight, in particular at least 95% by weight, based on the plastic recyclate.

According to the invention, it is preferred if the plastic recyclate has at least essentially only one (single) plastic grade, in particular only one (single) plastic grade according to DIN EN ISO 11469, in particular wherein the plastic grade is present with a (grade) purity of at least 90% by weight, in particular at least 95% by weight, based on the plastic recyclate.

In addition, it is preferred according to the invention if the plastic recyclate comprises at least substantially only single-grade plastic, in particular wherein the (plastic) grade purity, in particular the grade purity of the plastic grade according to DIN EN ISO 11469, is at least 90% by weight, in particular at least 95% by weight, based on the plastic recyclate.

By using unmixed plastic recyclate for the production of the plastic films according to the invention, the plastic film is suitable for recycling again and can be reprocessed into new plastic recyclate and subsequently into new plastic-based products.

In this context, according to a further particular embodiment, it is provided that the plastic film according to the invention is also single-grade.

In particular, the multilayer plastic film according to the invention has a (plastic) grade purity, in particular grade purity of the plastic grade according to DIN EN ISO 11469, of at least 90% by weight, in particular at least 95% by weight, based on the plastic (content) of the multilayer plastic film.

Typically, the multilayer plastic film according to the invention is designed to be at least substantially (plastic) grade-pure. In particular, the multilayer plastic film has a (plastic) grade purity, in particular grade purity of the plastic grade according to DIN EN ISO 11469, of at least 90% by weight, in particular at least 95% by weight, based on the plastic (content) of the multilayer plastic film.

Preferably, the multilayer plastic film according to the invention has at least essentially only one (single) type of plastic, in particular only one (single) type of plastic according to DIN EN ISO 11469, in particular the type of plastic is present with a (grade) purity of at least 90% by weight, in particular at least 95% by weight, based on the plastic (content) of the multilayer plastic film.

In general, the multilayer plastic film according to the invention has at least essentially only single-grade plastic, in particular where the (plastic) grade purity, in particular the grade purity of the plastic grade according to DIN EN ISO 11469, is at least 90% by weight, in particular at least 95% by weight, based on the plastic (content) of the multilayer plastic film.

If the entire multilayer plastic film according to the invention consists at least substantially of single-grade plastic or comprises at least substantially only single-grade plastic, the plastic film according to the invention is suitable for recycling after its use, so that a sustainable economic cycle is formed, the quantities of waste produced and to be disposed of are reduced, and environmental protection and the earth's resource management are supported.

Furthermore, it may be provided in the context of the present invention that the multilayer plastic film according to the invention comprises only plastic recyclate(s) of a (single) plastic grade, in particular plastic recyclate(s) of a (single) plastic grade according to DIN EN ISO 11469.

In this context, it is preferred if the multilayer plastic film according to the invention, apart from the recycled plastic and the metal layer, comprises at least essentially only ingredients from the group of fillers, colorants, color pigments, fragrances, antiblocking agents, slip agents, stabilizers, plasticizers and plasticizers, binders, adhesives, primary plastics of the same plastic grade according to DIN EN ISO 11469 as the recycled plastic, auxiliaries and additives, and mixtures and combinations thereof.

In particular, according to a particular embodiment of the present invention, it may be provided that the multilayer plastic film according to the invention does not comprise a different and/or further and/or additional plastic recyclate.

In this context, only plastic recyclate of one plastic grade, as previously defined, can be used within the scope of the present invention, whereby plastic recyclates from different batches can be used as long as it is a (single) plastic grade, in particular a (single) plastic grade according to DIN EN ISO 11469.

In particular, it is preferred according to the invention if the multilayer plastic film according to the invention does not have a different and/or further and/or additional type of plastic, in particular a different and/or further and/or additional type of plastic according to DIN EN ISO 11469.

Overall, the present invention is thus intended to provide a multilayer plastic film which consists at least essentially of one (single) type of plastic and is thus—for this reason, among others—particularly well suited for recycling again.

According to the invention, it can be provided in particular that the multilayer plastic film according to the invention has a (total) plastic content in the range from 80% by weight to 99.95% by weight, in particular in the range from 82.5% by weight to 99.5% by weight, preferably in the range from 85% by weight to 99% by weight, particularly preferably in the range from 87% by weight to 98% by weight, based on the multilayer plastic film.

In this context, the (total) plastic content refers both to the plastic recyclate and to any primary plastics of the same plastic grade according to DIN EN ISO 11469 as the plastic recyclate used. Overall, the plastic film according to the invention in accordance with this embodiment thus consists essentially of plastic, with only a small proportion of further materials, depending on the area of application and the corresponding requirements, being contained in the plastic film (whereby these further plastics do not comprise any plastic which does not correspond to the same grade as the plastic recyclate).

According to the invention, it may further be provided that the multilayer plastic film according to the invention has a metal content, in particular in the form of the metal layer, in amounts in the range from 0.05% by weight to 20% by weight, in particular in the range from 0.1% by weight to 15% by weight, preferably in the range from 0.2% by weight to 10% by weight, particularly preferably in the range from 0.3% by weight to 5% by weight, based on the multilayer plastic film.

In this context, the aforementioned metal content in particular provides reliable barrier properties for the multilayer plastic film according to the invention, especially without impairing recyclability.

Furthermore, within the scope of the present invention, the multilayer plastic film according to the invention may contain ingredients selected from the group of fillers, colorants, color pigments, fragrances, antiblocking agents, lubricants, stabilizers, plasticizers and plasticizers, binders, adhesives, auxiliaries and additives, as well as mixtures and combinations thereof, in particular in amounts in the range of 0.1 wt % to 20 wt. %, in particular in the range from 0.2 wt. % to 17.5 wt %, preferably in the range from 0.2 wt % to 15 wt %, based on the multilayer plastic film.

By adding such further auxiliary materials—in addition to the recycled plastic, the primary plastic of the same type of plastic that may be present and the metal of the metal layer—the properties, in particular the mechanical, optical, haptic, etc. properties, of the multilayer plastic film according to the invention can be adapted or adjusted. properties, of the multilayer plastic film according to the invention can be adapted or adjusted. The plastic film according to the invention can thus be tailored for its corresponding use or application.

According to a particular embodiment of the present invention, it may be provided that the multilayer plastic film according to the invention is
- plastic recyclate in amounts ranging from 80% by weight to 97% by weight, in particular in amounts ranging from 82% by weight to 96% by weight, preferably in amounts ranging from 84% by weight to 95% by weight;
- optionally primary plastic(s) of the same plastic grade according to DIN EN ISO 11469 as the plastic recyclate, in particular in amounts in the range from 0.1% by weight to 15% by weight, preferably in amounts in the range from 0.5% by weight to 10% by weight, preferably in amounts in the range from 1% by weight to 9% by weight;
- metal(s), in particular in the form of the metal layer, in amounts ranging from 0.05 wt. % to 20 wt %, in particular ranging from 0.1 wt % to 15 wt %, preferably in the range of 0.2 wt. % to 10 wt %, particularly preferably in the range of 0.3 wt % to 5 wt %;
- ingredients selected from the group of fillers, colorants, color pigments, fragrances, antiblocking agents, lubricants, stabilizers, plasticizers and softeners, binders, adhesives, auxiliaries and additives, as well as mixtures and combinations thereof, in amounts in the range of 0.1% by weight to 20% by weight, in particular in the range from 0.2% by weight to 17.5% by weight, preferably in the range from 0.2% by weight to 15% by weight, the above weight percentages being based on the multilayer plastic film and being combined and/or selected to give 100% by weight.

Plastic films with these ingredients in the appropriate quantities are particularly suitable as packaging material or for use as packaging material, continue to exhibit barrier properties and are also suitable for recycling again.

The layer thickness of the multilayer plastic film according to the invention can vary in wide ranges:

In particular, the multilayer plastic film according to the invention can have a layer thickness in the range from 10 µm to 300 µm, especially in the range from 15 µm to 200 µm, preferably in the range from 20 µm to 180 µm, particularly preferably in the range from 25 µm to 175 µm.

Furthermore, the multilayer plastic film according to the invention can have a layer thickness of at least 10 µm, in particular at least 15 µm, preferably at least 20 µm, particularly preferably at least 25 µm.

Furthermore, the multilayer plastic film according to the invention can have a layer thickness of up to 300 µm, in particular up to 200 µm, preferably up to 180 µm, particularly preferably up to 175 µm.

The layer thickness of the multilayer plastic film according to the invention can vary in wide ranges and is therefore particularly well adaptable to its corresponding application. In particular, the mechanical properties, such as tensile strength, elongation at break and dynamic puncture resistance, depend on the corresponding layer thickness. In addition, however, the processability and stability also change with the layer thickness. In particular, when the multilayer plastic film according to the invention is used as a packaging material, there may be different requirements (for example, depending on the goods to be packaged or the goods to be packaged), so that the multilayer plastic film must be adapted according to its use.

Within the scope of the present invention, it is preferred according to a particular embodiment if the metal layer and/or the metal of the metal layer is selected from the group of pure metals of one metal type, alloys of metals, mixtures of metals, metal compounds, in particular metal oxides, and mixtures of metal compounds as well as combinations thereof, preferably from the group of pure metals of one metal type, alloys of metals, mixtures of metals as well as combinations thereof, particularly preferably from pure metals of one metal type.

In particular, it may be preferred if the metal layer consists at least substantially of or is formed from a pure metal of one metal type, in particular a transition metal or a light metal, preferably aluminum.

In this context, it may be particularly preferred if the metal layer consists at least substantially of aluminum or is formed therefrom, in particular wherein the aluminum content of the metal layer, based on the metal layer, is at least 95% by weight, in particular at least 96% by weight, preferably at least 97% by weight, more preferably at least 98% by weight, very particularly preferably at least 99% by weight.

In this context, the remaining component of the metal layer may optionally consist of common impurities or foreign metals, such as zinc, tin, copper, nickel, titanium, silicon, etc., whereby it is advantageous in the context of the present invention if as pure an aluminum layer as possible is present (i.e., as low a proportion of impurities or as low a proportion of foreign metal as possible is present in the metal layer or aluminum layer).

The layer thickness of the metal layer according to the invention can also vary in wide ranges:

In particular, the metal layer can have a layer thickness in the range from 0.001 µm to 50 µm, especially in the range from 0.0015 µm to 35 µm, preferably in the range from 0.002 µm to 20 µm, particularly preferably in the range from 0.003 µm to 10 µm.

Furthermore, the metal layer can have a layer thickness of at least 0.001 µm, in particular of at least 0.0015 µm, preferably of at least 0.002 µm, particularly preferably of at least 0.003 µm.

In addition, the metal layer can have a layer thickness of up to 50 µm, in particular of up to 35 µm, preferably of up to 20 µm, particularly preferably of up to 10 µm.

Similarly, the proportion of the metal layer relative to the multilayer plastic film according to the invention can also vary in broad ranges:

In particular, the metal of the metal layer, based on the multilayer plastic film, may be present in amounts and/or in a proportion in the range from 0.05% by weight to 20% by weight, in particular in the range from 0.1% by weight to 15% by weight, preferably in the range from 0.2% by weight to 10% by weight, more preferably in the range from 0.3% by weight to 5% by weight.

In addition, the metal of the metal layer, relative to the multilayer plastic film, may be present in amounts and/or in a proportion of at least 0.05% by weight, in particular at least 0.1% by weight, preferably at least 0.2% by weight, particularly preferably at least 0.3% by weight.

Furthermore, the metal of the metal layer, relative to the multilayer plastic film, may be present in amounts and/or in a proportion of up to 20% by weight, in particular of up to 15% by weight, preferably of up to 10% by weight, particularly preferably of up to 5% by weight.

In a preferred embodiment of the present invention, the metal layer may be formed as an at least substantially full surface layer and/or as an at least substantially continuous layer and/or as an at least substantially continuous layer and/or as an at least substantially uninterrupted layer and/or as an at least substantially continuous layer.

According to a further preferred embodiment, the metal layer may be formed at least substantially without gaps and/or at least substantially without gaps.

By forming the metal layer as an at least substantially full-surface or continuous or interruption-free or coherent layer, which is thus formed at least substantially without gaps or gaps-free, particularly high barrier properties are provided over the entire surface of the multilayer plastic film according to the invention.

According to a particular embodiment of the present invention, the metal layer may exhibit barrier layer properties (barrier properties) to water vapor and/or gases, preferably oxygen, preferably barrier layer properties to water vapor and gases, preferably oxygen.

The barrier properties of the metal layer also give the multilayer plastic film according to the invention as such or as a whole the corresponding barrier properties. In particular, no further or different type of plastic is required to provide these barrier layer or barrier properties, which would impair the recyclability of the multilayer plastic film according to the invention. There is precisely no impairment of the recyclability of the plastic film by the metal layer.

According to a particular embodiment of the present invention, the metal layer may be produced by thin film techniques, in particular by vapor deposition, thermal spraying or plastic electroplating, preferably by vapor deposition, in particular by physical vapor deposition (PVC) or chemical vapor deposition (CVD).

The aforementioned techniques are basically known to the person skilled in the art, whereby in this context, in particular with regard to vapor phase deposition, reference can be made, for example, to the documents EP 1 936 004 A1, DE 196 12 345 C1, EP 1 132 197 A2.

With the aforementioned techniques, it is possible in particular to provide particularly thin and uniform but nevertheless high-performance coatings. This is well known to the skilled person.

According to another particular embodiment of the present invention, the metal layer may be produced by means of metallization and/or by means of metallization techniques. As such, these techniques are very familiar to those skilled in the art.

In the context of the present invention, it may be particularly advantageous if the metal layer is preferably applied to the inside, to at least one of the outer films, in particular to the first outer film, and/or is attached thereto.

Further, in the context of the present invention, it may be advantageous if the metal layer is applied to and/or attached to an inner surface of the two outer films.

Furthermore, according to a preferred embodiment of the present invention, it may be provided that the metal layer is applied to and/or attached to the inner side of the first outer film and/or to the side of the first outer film facing the second outer film.

In this context, the internal attachment is particularly advantageous, as the metal layer is protected from wear or damage and thus the barrier properties are not reduced even under mechanical stress.

In this context, however, an outside application is also possible in principle. If the metal layer is applied on the outside, it can be particularly advantageous if a protective coating or an additional protective film is additionally arranged over the metal layer so that the metal layer is protected from wear and tear or damage, as explained above.

In this context, in particular the film side which is provided with the metal layer can be pretreated, in particular by means of corona or plasma treatment, so that improved adhesion of the metal layer to the corresponding film side is made possible. Such a procedure is sufficiently known as such to the skilled person.

In a preferred embodiment of the present invention, it may be provided that the metal layer is applied to and/or attached to the inner side of the first outer film and/or to the side of the first outer film facing the second outer film, in particular by means of metallization and/or thin-film technology, preferably by means of gas phase deposition, and/or in particular with a layer thickness in the range from 0.001 µm to 50 µm, in particular in the range from 0.0015 µm to 35 µm, preferably in the range from 0.002 µm to 20 µm, particularly preferably in the range from 0.003 µm to 10 µm, and/or in particular in quantities and/or with a proportion in the range from 0.05% by weight to 20% by weight, in particular in the range from 0.1% by weight to 15% by weight, preferably in the range from 0.2% by weight to 10% by weight, particularly preferably in the range from 0.3% by weight to 5% by weight, based on the multilayer plastic film, and/or in particular as an aluminum layer.

In accordance with this aspect of the present invention, a particular object of the present invention is a multilayer plastic film, in particular multilayer plastic composite film, preferably multilayer plastic packaging film, based on recycled plastic (recycled plastic), in particular based on recycled plastic derived from waste, and having barrier layer properties (barrier properties) to water vapor and/or gases, preferably oxygen, preferably having barrier layer properties (barrier properties) to water vapor and gases, preferably oxygen, in particular a multilayer plastic film as defined above, wherein the multilayer plastic film comprises a laminate of multiple, in particular at least three, layers bonded together, wherein the multilayer plastic film and/or the layer composite comprises a first outer film (=carrier film) and a second outer film (=laminating or cover film) and a metal layer arranged between the first outer film and the second outer film, wherein the multilayer plastic film has a plastic recyclate content of at least 80% by weight, based on the multilayer plastic film, and wherein the metal layer is applied to and/or attached to the inner side of the first outer film and/or to the side of the first outer film facing the second outer film;

in particular wherein the metal layer is produced by means of metallization and/or thin film techniques, preferably by means of vapor deposition; and/or in particular wherein the metal layer is formed with a layer thickness in the range from 0.001 µm to 50 µm, in particular in the range from 0.0015 µm to 35 µm, preferably in the range from 0.002 µm to 20 µm, particularly preferably in the range from 0.003 µm to 10 µm;

in particular wherein the metal layer is present in amounts and/or with a proportion in the range from 0.05 wt % to 20 wt %, in particular in the range from 0.1 wt % to 15 wt %, preferably in the range from 0.2 wt % to 10 wt %, particularly preferably in the range from 0.3 wt % to 5 wt %, based on the multilayer plastic film;

in particular wherein the metal layer is formed as an aluminum layer and/or in particular wherein the metal layer consists at least substantially of aluminum or is formed therefrom, preferably wherein the aluminum content of the metal layer, based on the metal layer, is at least 95% by weight, in particular at least 96% by weight, preferably at least 97% by weight, particularly preferably at least 98% by weight, very particularly preferably at least 99% by weight.

In particular, such a multilayer plastic film according to the invention exhibits high barrier layer or barrier properties with a simultaneously low good and individual adjustable (i.e. tailorable) or a low proportion of the metal layer, so that there is a high environmental compatibility and recyclability.

Within the scope of the present invention, it may be provided that the metal layer is opaque, in particular opaque with respect to the wavelength range of visible light. In particular, the metal layer has an opacity of at least 10%, in particular of at least 20%, preferably of at least 25%, especially preferably of at least 30%, in particular determined according to DIN 53146.

In this context, it may be provided in particular that the metal layer has an optical density in the range from 1 to 5, in particular in the range from 1.5 to 4, preferably in the range from 2 to 3, in particular determined according to JIS K7605.

The term opacity generally refers to the opposite or the inverse of transparency, i.e. lack of transparency or lack of permeability. The term is used particularly in optics and with reference to materials. Opacity is thus a measure of the opacity (haze) of translucent (scattering translucent) materials and coatings. Clear materials (with low scattering), on the other hand, are transparent; their light (in)transmission is expressed as optical density (logarithmic) or transmittance (linear). Opacity is the reciprocal of transmission.

The opacity thus describes the degree of opacity or opacity to light in percent. In particular, the opacity of a completely opaque plastic film is 100% and a completely or totally transparent plastic film has an opacity of 0%.

In this context, the term "opaque" is understood to mean in particular the lack of transparency or opacity, especially opacity to light. In particular, opaque plastic films are just not transparent in the wavelength range of visible light. The wavelength range of visible light refers in particular to electromagnetic radiation in the wavelength range from 300 nm to 780 nm.

According to a particular embodiment of the present invention, it may be provided that the (summed) layer thicknesses of the outer films are 60% to 99.9%, in particular 70% to 99.5%, preferably 80% to 99.5%, particularly preferably 85% to 99%, of the (total) layer thickness of the multilayer plastic film.

In the context of the present invention, it is thus a multilayer plastic film which has plastic as its main constituent. Furthermore, the outer films give the multilayer plastic film according to the invention its stability, optical properties, haptic properties, etc. In particular, the metal layer imparts barrier properties to the multilayer plastic film according to the invention, whereby in this context a very low layer thickness is sufficient to provide high-performance barrier properties.

In this context, it may be provided in particular that the ratio of the thicknesses of the first outer film/metal layer/second outer film varies in the range of 50-90:0.5-20:30-60.

In the context of the present invention, in particular, the first outer film, which is also called the carrier film, provides stability and, if necessary, opacity to the multilayer plastic film according to the invention, and the metal layer provides barrier layer properties and a certain degree of opacity to the plastic film according to the invention, in particular, while the second outer film, which is also called the laminating or cover film, provides sufficient protection for the metal or the metal layer and further enables the printability of the multilayer plastic film according to the invention.

According to a particular embodiment of the present invention, it may be provided that the first outer film (=carrier film) comprises a laminated composite of at least three film layers bonded to one another, in particular bonded and/or coextruded by means of coextrusion.

Furthermore, according to this particular embodiment of the present invention, it can be provided that (also) the second outer film (=laminating or cover film) comprises a layer composite of at least three film layers bonded to one another, in particular bonded and/or coextruded by means of coextrusion, or else that the second outer film is formed as a single-layer film, in particular as a single-layer plastic film preferably based on plastic recyclate or as a single-layer lacquer film. Preferably, however, the second outer film comprises a laminated composite of at least three film layers bonded to one another, in particular bonded and/or coextruded by means of coextrusion.

In accordance with this aspect of the present invention, a particular object of the present invention is a multilayer plastic film, in particular multilayer plastic composite film, preferably multilayer plastic packaging film, based on recycled plastic (recycled plastic), in particular based on recycled plastic derived from waste, and with barrier properties against water vapor and/or gases, preferably oxygen, preferably with barrier properties against water vapor and gases, preferably oxygen, in particular a multilayer plastic film as defined above, wherein the multilayer plastic film comprises a laminate of multiple, in particular at least three, layers bonded together, wherein the multilayer plastic film and/or the layer composite comprises a first outer film (=carrier film) and a second outer film (=laminating or cover film) and a metal layer arranged between the first outer film and the second outer film, wherein the multilayer plastic film has a plastic recyclate content of at least 80% by weight, based on the multilayer plastic film, wherein the first outer film comprises a laminate of at least three film layers bonded together, in particular bonded and/or coextruded by means of coextrusion, wherein the second outer film comprises a layered composite of at least three film layers bonded to one another, in particular bonded and/or coextruded by means of coextrusion, or else is formed as a single-layer film, in particular as a single-layer plastic film preferably based on plastic recyclate or as a single-layer lacquer film, preferably wherein the second outer film comprises a layered composite of at least three film layers bonded to one another, in particular bonded and/or coextruded by means of coextrusion, and wherein the metal layer is applied to and/or attached to the inner side of the first outer film and/or to the side of the first outer film facing the second outer film;

in particular wherein the metal layer is produced by means of metallization and/or thin film techniques, preferably by means of gas phase deposition; and/or in particular wherein the metal layer is formed with a layer thickness in the range from 0.001 µm to 50 µm, in particular in the range from 0.0015 µm to 35 µm, preferably in the range from 0.002 µm to 20 µm, particularly preferably in the range from 0.003 µm to 10 µm; and/or in particular wherein the metal layer is present in amounts and/or with a proportion in the range from 0.05 wt % to 20 wt. %, in particular in the range from 0.1 wt. % to 15 wt %, preferably in the range from 0.2 wt % to 10 wt %, particularly preferably in the range from 0.3 wt % to 5 wt %, relative to the multilayer plastic film; and/or in particular wherein the metal layer is formed as an aluminum layer and/or in particular wherein the metal layer consists at least substantially of aluminum or is formed therefrom, preferably wherein the aluminum content of the metal layer, based on the metal layer, is at least 95% by weight, in particular at least 96% by weight, preferably at least 97% by weight, particularly preferably at least 98% by weight, very particularly preferably at least 99% by weight.

A plastic film according to the invention, in particular with the previously defined coextruded layer composites as outer films, allows improved tailoring or more precise adaptability of the end properties of the plastic film according to the invention.

Furthermore, according to this aspect of the present invention, it is in particular an object of the present invention to provide a multilayer plastic film, in particular a multilayer plastic composite film, preferably multilayer plastic packaging film, based on plastic recyclate (recycled plastic), in particular based on plastic recyclate derived from waste, and having barrier layer properties (barrier properties) to water vapor and/or gases, preferably oxygen, preferably having barrier layer properties (barrier properties) to water vapor and gases, preferably oxygen, in particular a multilayer plastic film as defined above, wherein the multilayer plastic film comprises a laminate of multiple, in particular at least three, layers bonded together, wherein the multilayer plastic film and/or the layer composite comprises a first outer film (=carrier film) and a second outer film (=laminating or cover film) and a metal layer arranged between the first outer film and the second outer film, wherein the multilayer plastic film has a plastic recyclate content of at least 80% by weight, based on the multilayer plastic film, wherein the outer films each comprise a laminated composite of at least three film layers bonded to one another, in particular bonded and/or coextruded by means of coextrusion, and wherein the metal layer is applied to and/or attached to the inner side of the first outer film and/or to the side of the first outer film facing the second outer film;

in particular wherein the metal layer is produced by means of metallization and/or thin film techniques, preferably by means of vapor deposition; and/or in particular wherein the metal layer is formed with a layer thickness in the range of 0.001 µm to 50 µm, in particular in the range of 0.0015 µm to 35 µm, preferably in the range of 0.002 µm to 20 µm, particularly preferably in the range of 0.003 µm to 10 µm; and/or in particular wherein the metal layer is present in amounts and/or with a proportion in the range from 0.05 wt % to 20 wt %, in particular in the range from 0.1 wt % to 15 wt %, preferably in the range from 0.2 wt % to 10 wt %, particularly preferably in the range from 0.3 wt % to 5 wt %, based on the multilayer plastic film; and/or in particular wherein the metal layer is formed as an aluminum layer and/or in particular wherein the metal layer consists at least substantially of aluminum or is formed therefrom, preferably wherein the aluminum content of the metal layer, based on the metal layer, is at least 95% by weight, in particular at least 96% by weight, preferably at least 97% by weight, more preferably at least 98% by weight, very particularly preferably at least 99% by weight.

According to a particular embodiment of the present invention, it may be advantageous if the outer films each comprise a laminated composite of at least three film layers bonded together, in particular bonded and/or coextruded by means of coextrusion.

In particular, in this context, the outer films may each comprise a first outer film layer and a second outer film layer and a middle film layer disposed between the first outer film layer and the second outer film layer.

Such an at least three-layer structure of the two outer films is particularly advantageous, since the formation of such a layer composite makes it possible to design the individual film layers differently, in particular with different properties, so that the overall properties of the individual outer films can be tailored individually. In this context, in particular the surface properties, such as roughness, or also the optical properties of the individual film layers within the outer films can vary.

According to a particular embodiment of the present invention, it may be provided that the outer films each have a plastic recyclate content of at least 80% by weight, based on the respective film layer.

According to another particular embodiment of the present invention, it may also be provided that the outer films and/or the film layers each have a plastic recyclate content of at least 80% by weight, based on the outer films and/or on the respective film layer.

Thus, not only the multilayer plastic film according to the invention as a whole or as a whole should have a plastic recyclate content of at least 80% by weight, but also in each case the individual outer films and the film layers of the outer films. Thus, both the films or film layers forming the plastic film and the entire plastic film are based at least substantially (i.e., at least 80% by weight) on plastic recyclate. It is therefore not necessary to integrate one or more layers as primary plastics into the multilayer plastic film according to the invention in order to achieve essentially equivalent or comparable properties (e.g. mechanical and/or optical and/or haptic etc. properties) as in the case of plastics based on primary plastics.

Furthermore, it is advantageous if the outer films and/or the film layers each have a plastic recyclate that is the same and/or similar with respect to the plastic forming the plastic recyclate, in particular with respect to the type of plastic forming the plastic recyclate according to DIN EN ISO 11469.

In this context, it is equally advantageous if the outer films and/or the film layers each have an identical and/or similar plastic grade with respect to the plastic forming the recyclate, in particular in accordance with DIN EN ISO 11469.

The individual outer films and the film layers of the plastic film according to the invention are thus, in particular, each of a single type and are therefore also suitable for recycling.

Furthermore, it is also advantageous in this respect if the outer films and/or the film layers each have a (plastic) grade purity, in particular grade purity of the plastic grade according to DIN EN ISO 11469, of at least 90% by weight, in particular at least 95% by weight, based on the plastic (content) of the respective outer film and/or the respective film layer.

In addition, it is further advantageous if the outer films and/or the film layers are each designed to be at least substantially (plastic) grade-pure, in particular wherein the outer films and/or the films layers each have a (plastic) grade purity, in particular grade purity of the plastic grade according to DIN EN ISO 11469, of at least 90% by weight, in particular at least 95% by weight, based on the plastic (content) of the respective outer film and/or the respective film layer.

At the same time, it is also advantageous if the outer films and/or the films layers each comprise at least essentially only one (single) type of plastic, in particular only one (single) type of plastic in accordance with DIN EN ISO 11469, in particular wherein the type of plastic is present in each case with a (grade) purity of at least 90% by weight, in particular at least 95% by weight, based on the plastic (content) of the respective outer film and/or the respective film layer.

Furthermore, it is preferred if the outer films and/or the film layers each comprise at least substantially only single-grade plastic, in particular wherein the (plastic) grade purity, in particular the grade purity of the plastic grade according to DIN EN ISO 11469, is in each case at least 90% by weight, in particular at least 95% by weight, based on the plastic (content) of the respective outer film and/or the respective film layer.

Furthermore, according to a preferred embodiment, it may be provided that the outer films and/or the film layers each comprise a plastic recyclate based on polyethylene (PE recyclate), the outer films and/or the film layers each having a plastic recyclate content of at least 80% by weight, based on the respective outer film and/or the respective film layer.

In particular, it may be preferred in this context if the polyethylene-based plastic recyclate (PE recyclate) has a (polyethylene) grade purity of at least 90% by weight, in particular at least 95% by weight, based on the polyethylene-based plastic recyclate.

In particular, the use of polyethylene as a plastic or the use of polyethylene-based plastic recyclate is advantageous because waste products based on polyethylene are available in high quantities and polyethylene is very suitable for recycling. In addition, polyethylene is easy to process and suitable for a wide range of applications.

Furthermore, it may be provided in particular that the outer films and/or the film layers additionally comprise primary polyethylene (polyethylene as and/or in the form of primary plastic), in particular in amounts in the range from 0.1% by weight to 15% by weight, in particular in amounts in the range from 0.5% by weight to 10% by weight, preferably in amounts in the range from 1% by weight to 9% by weight, based on the respective outer film and/or the respective film layer.

The end properties of the plastic film according to the invention can be adjusted by the targeted addition of small amounts of primary polyethylene. In particular, specific polyethylene types, such as polyethylene with a specific molecular weight (e.g. UHMWPE, VLDPE, etc.) and/or polyethylene with a specific density (e.g. HDPE, MDPE, LDPE, LLDPE, etc.) can be added in this context in a targeted manner and depending on the desired properties.

The individual film layers and/or outer films are basically independent of one another in terms of their production or composition and thus their properties, although it is or can be advantageous—as explained above—if all the films and/or film layers in each case consist at least essentially of the same type of plastic, preferably polyethylene, and are thus based essentially on recycled plastic and optionally contain at most only small amounts of primary plastic and/or other auxiliary materials.

According to a particular embodiment of the present invention, it may be provided that the layer thickness of the middle film layer is in each case 35% to 65%, in particular 40% to 60%, preferably 45% to 55%, particularly preferably about 50%, of the (total) layer thickness of the respective outer film.

Also, according to a particular embodiment of the present invention, it may be provided that the (summed) layer thicknesses of the outer film layers are each 35% to 65%, in particular 40% to 60%, preferably 45% to 55%, particularly preferably about 50%, of the (total) layer thickness of the respective outer film.

In this context, it may be provided in particular that the ratio of the layer thicknesses of first outer film layer/middle film layer/second outer film layer within the respective outer film varies in the range of 10-35:40-60:10-35, in particular in the range of 15-30:45-55:15-30.

The middle film layer gives the outer films of the invention their stability, while the outer film layers of the respective outer films determine the optical properties, adhesion and friction, haptics and finishability, in particular printability and coatability. The specific combination of the middle film layer and the two outer film layers determines the impermeability and uniformity of the film as a whole. By adjusting the layer thickness proportions in the respective outer film, the end properties, in particular optical properties, adhesion and friction, haptics, printability, impermeability, uniformity as well as the stability of the corresponding outer film and also of the multilayer plastic film according to the invention can be tailored and adjusted according to the application.

In particular, the outer films and/or at least two of the film layers may have different properties.

In this context, the outer films and/or at least two of the film layers may have different layer thicknesses.

In addition, the outer films and/or at least two of the film layers can have different optical properties, in particular different opacities and/or different colorations.

Further, the outer films and/or at least two of the film layers may have different ingredients, particularly as previously defined.

In addition, the outer films and/or at least two of the film layers may have different mechanical properties, in particular different tensile strengths in the longitudinal and/or transverse direction and/or different elongations at break in the longitudinal and/or transverse direction and/or different dynamic puncture strengths and/or different coefficients of friction.

Due to the different properties of the individual film layers (in particular, for example, through different layer thicknesses, different opacities or colorations, different ingredients and/or different mechanical properties, etc.), the properties of the outer films and the (overall) plastic film can be adjusted, so that it is possible to tailor the properties of the plastic film according to the invention to suit its application. In this context, for example, the two outer films can thereby have different haptic and/or optical properties.

In the context of the present invention, it may be advantageous if the multilayer plastic film according to the invention additionally has a bonding layer and/or an adhesive layer.

In particular, the multilayer plastic film according to the invention may additionally have a bonding layer and/or adhesive layer.

In particular, it may be advantageous if the bonding layer and/or adhesive layer is applied and/or applied to at least one of the outer films, preferably on the inside, in particular to the second outer film.

Furthermore, it may be provided that the bonding layer and/or adhesive layer is applied and/or applied to an inner side of the two outer films.

Furthermore, it may be provided that the bonding layer and/or adhesive layer is bonded and/or applied to the inner side of the second outer film and/or to the side of the second outer film facing the first outer film.

In particular, it may be advantageous if the bonding layer and/or adhesive layer is arranged between the metal layer and the second outer film. Preferably, the adhesive layer and/or bonding layer is bonded and/or applied to the inner side of the second outer film and/or to the side of the second outer film facing the first outer film and is bonded and/or applied to the metal layer, in particular bonded and/or applied over the entire surface.

In addition, it may be provided that the bonding layer and/or adhesive layer is present in an amount in the range of 1 g/m$^2$ to 5 g/m$^2$, particularly in the range of 1.5 g/m$^2$ to 4 g/m$^2$, preferably in the range of 1.75 g/m$^2$ to 3.5 g/m$^2$, more preferably in the range of 2 g/m$^2$ to 3 g/m$^2$, most preferably of about 2.5 g/m$^2$.

Furthermore, it may be advantageous if the adhesive layer and/or bonding layer is formed at least substantially from reactive polyurethane adhesive.

In this context, it is particularly advantageous if the side of the film that is provided with the adhesive layer and/or bonding layer is pretreated, in particular by means of corona or plasma treatment. This process or method is sufficiently known as such to the person skilled in the art.

In particular, it is also an object of the present invention according to this aspect of the invention to provide a multilayer plastic film, in particular multilayer plastic composite film, preferably multilayer plastic packaging film, based on plastic recyclate (recycled plastic), in particular based on plastic recyclate derived from waste, and having barrier properties to water vapor and/or gases, preferably oxygen, preferably having barrier properties to water vapor and gases, preferably oxygen, in particular a multilayer plastic film as defined above, wherein the multilayer plastic film comprises a laminate of multiple, in particular at least three, layers bonded together, wherein the multilayer plastic film and/or the layer composite comprises a first outer film (=carrier film) and a second outer film (=laminating or cover film) and a metal layer arranged between the first outer film and the second outer film, wherein the multilayer plastic film has a plastic recyclate content of at least 80% by weight, based on the multilayer plastic film;

wherein the outer films each comprise a layer composite of at least three film layers bonded to one another, in particular bonded and/or coextruded by means of coextrusion;

wherein the multilayer plastic film additionally has a bonding layer and/or an adhesive layer, in particular wherein the bonding layer and/or adhesive layer is arranged between the metal layer and the second outer film, preferably wherein the bonding layer and/or adhesive layer is applied and/or applied to the inner side of the second outer film and/or to the side of the second outer film facing the first outer film and is bonded and/or adhered to the metal layer, in particular bonded and/or adhered over the entire surface; and wherein the metal layer is applied to and/or attached to the inner side of the first outer film and/or to the side of the first outer film facing the second outer film;

in particular wherein the metal layer is produced by means of metallization and/or thin film techniques, preferably by means of vapor deposition; and/or in particular wherein the metal layer is formed with a layer thickness in the range of 0.001 µm to 50 µm, in particular in the range of 0.0015 µm to 35 µm, preferably in the range of 0.002 µm to 20 µm, particularly preferably in the range of 0.003 µm to 10 µm; and/or in particular wherein the metal layer is present in amounts and/or with a proportion in the range of 0.05 wt. % to 20 wt %, in particular in the range of 0.1 wt % to 15 wt %, preferably in the range of 0.2 wt % to 10 wt %, particularly preferably in the range of 0.3 wt % to 5 wt %, relative to the multilayer plastic film; and/or in particular wherein the metal layer is formed as an aluminum layer and/or in particular wherein the metal layer consists at least substantially of aluminum or is formed therefrom, preferably wherein the aluminum content of the metal layer, based on the metal layer, is at least 95% by weight, in particular at least 96% by weight, preferably at least 97% by weight, particularly preferably at least 98% by weight, very particularly preferably at least 99% by weight.

Furthermore, it is in particular also an object of the present invention according to this aspect of the invention to provide a multilayer plastic film, in particular multilayer plastic composite film, preferably multilayer plastic packaging film, based on plastic recyclate (recycled plastic), in particular based on plastic recyclate originating from waste, and having barrier properties to water vapor and/or gases, preferably oxygen, preferably having barrier properties to water vapor and gases, preferably oxygen, in particular a multilayer plastic film as defined above, wherein the multilayer plastic film comprises a laminate of multiple, in particular at least three, layers bonded together, wherein the multilayer plastic film and/or the layer composite comprises a first outer film (=carrier film) and a second outer film (=laminating or cover film) and a metal layer arranged between the first outer film and the second outer film, wherein the multilayer plastic film has a plastic recyclate content of at least 80% by weight, based on the multilayer plastic film;

wherein the outer films each comprise a layer composite of at least three film layers bonded to one another, in particular bonded and/or coextruded by means of coextrusion, wherein the outer films and/or the film layers each have a plastic recyclate which is identical and/or of the same type with respect to the plastic forming the plastic recyclate, in particular with respect to the plastic grade according to DIN EN ISO 11469 forming the plastic recyclate;

wherein the multilayer plastic film additionally has a bonding layer and/or an adhesive layer, in particular wherein the bonding layer and/or adhesive layer is arranged between the metal layer and the second outer film, preferably wherein the bonding layer and/or adhesive layer is applied and/or applied to the inner side of the second outer film and/or to the side of the second outer film facing the first outer film and is bonded and/or adhered to the metal layer, in particular bonded and/or adhered over the entire surface; and wherein the metal layer is applied to and/or attached to the inner side of the first outer film and/or to the side of the first outer film facing the second outer film;

in particular wherein the metal layer is produced by means of metallization and/or thin film techniques, preferably by means of vapor deposition; and/or in particular wherein the metal layer is formed with a layer thickness in the range from 0.001 µm to 50 µm, in particular in the range from 0.0015 µm to 35 µm, preferably in the range from 0.002 µm to 20 µm, particularly preferably in the range from 0.003 µm to 10 µm; and/or in particular wherein the metal layer is present in amounts and/or with a proportion in the range of 0.05 wt-% to 20 wt. %, in particular in the range of 0.1 wt % to 15 wt %, preferably in the range of 0.2 wt % to 10 wt %,—particularly preferably in the range of 0.3 wt % to 5 wt %, relative to the multilayer plastic film; and/or in particular wherein the metal layer is formed as an aluminum layer and/or in particular wherein the metal layer consists at least substantially of aluminum or is formed therefrom, preferably wherein the aluminum content of the metal layer, based on the metal layer, is at least 95% by weight, in particular at least 96% by weight, preferably at least 97% by weight, particularly preferably at least 98% by weight, very particularly preferably at least 99% by weight.

Furthermore, it is further an object of the present invention according to this aspect of the invention to provide a multilayer plastic film, in particular multilayer plastic composite film, preferably multilayer plastic packaging film, based on plastic recyclate (recycled plastic), in particular based on plastic recyclate derived from waste, and having barrier layer properties (barrier properties) to water vapor and/or gases, preferably oxygen, preferably having barrier layer properties (barrier properties) to water vapor and gases, preferably oxygen, in particular a multilayer plastic film as defined above, wherein the multilayer plastic film comprises a laminate of multiple, in particular at least three, layers bonded together, wherein the multilayer plastic film and/or the layer composite comprises a first outer film (=carrier film) and a second outer film (=laminating or cover film) and a metal layer arranged between the first outer film and the second outer film, wherein the multilayer plastic film has a plastic recyclate content based on polyethylene (PE recyclate) of at least 80% by weight, based on the multilayer plastic film;

wherein the outer films each comprise a layer composite of at least three film layers bonded to one another, in particular bonded and/or coextruded by means of coextrusion, wherein the outer films and/or the film layers each comprise a plastic recyclate based on polyethylene (PE recyclate); wherein the multilayer plastic film additionally comprises a bonding layer and/or an adhesive layer, the bonding layer and/or adhesive layer being disposed between the metal layer and the second outer film; and wherein the metal layer is applied to the inner side of the first outer film and/or to the side of the first outer film facing the second outer film and/or is attached thereto, wherein the metal layer is formed with a layer thickness in the range of 0.001 µm to 50 µm, in particular in the range of 0.0015 µm to 35 µm, preferably in the range of 0.002 µm to 20 µm, particularly preferably in the range from 0.003 µm to 10 µm, and wherein the metal layer is formed as an aluminum layer and/or consists at least substantially of aluminum or is formed therefrom, in particular wherein the aluminum content of the metal layer, based on the metal layer, is at least 95 wt.-%.

Such a multilayer plastic film according to the invention, or the layer composite, exhibits a particularly strong bond, which is resistant even under strong mechanical stress, and also excellent barrier layer properties.

In the context of the present invention, the multilayer plastic film according to the invention should have a number of mechanical properties, in particular so that it is suitable for use as a packaging film or meets the requirement for use as a packaging film.

Typically, the multilayer plastic film according to the invention has a tensile strength in the longitudinal direction of at least 10 N/mm$^2$, in particular at least 15 N/mm$^2$, preferably at least 19 N/mm$^2$, in particular determined according to DIN EN ISO 527.

Advantageously, the multilayer plastic film according to the invention has a tensile strength in the transverse direction of at least 10 N/mm$^2$, in particular at least 12 N/mm$^2$, preferably at least 17 N/mm$^2$, in particular determined according to DIN EN ISO 527.

Tensile strength measures the maximum mechanical tension that the plastic film can withstand before it breaks and is expressed as a force per area. Tensile strength is a so-called intensive quantity or property, i.e. a state quantity which does not change with different sizes of the system under consideration, although this state quantity depends on the material, for example the manufacture of the specimen.

Preferably, the multilayer plastic film according to the invention has an elongation at break in the longitudinal direction of at least 150%, in particular at least 175%, preferably at least 200%, in particular determined according to DIN EN ISO 527.

In particular, the multilayer plastic film according to the invention has an elongation at break in the transverse direction of at least 180%, in particular at least 225%, preferably at least 250%, in particular determined according to DIN EN ISO 527.

The elongation at break also known as tensile strain at break indicates the remaining elongation of the tensile specimen after breakage in relation to the initial length, i.e. this determines the deformability or ductility of the plastic film. In other words, the elongation at break reflects the percentage ratio of the change in length at break to the initial length of the material and thus corresponds to the ability of a material to follow changes in shape or crack formation.

Preferably, the multilayer plastic film according to the invention has a dynamic puncture resistance of at least 1.2 g/μm, in particular at least 1.5 g/μm, preferably at least 1.7 g/μm, in particular determined according to ASTM D 1709-98 (Dart drop test).

The dynamic puncture resistance, synonymously also referred to as impact resistance, evaluates the impact strength or toughness of a plastic film. The dynamic puncture resistance is measured in particular by means of the so-called dart drop test, in which the plastic film is first clamped tightly and without wrinkles and then a drop hammer of variable weight is dropped onto the film from a defined height. The weight of the drop hammer is determined at which the film is punctured in 50% of the drop tests.

The friction behavior, in particular the coefficient of friction, of the plastic film according to the invention can also be adapted or tailored.

Typically, the (untreated) multilayer plastic film according to the invention has a coefficient of friction (COF) on metal of at most 0.45, in particular determined according to DIN 53375.

In particular, the treated multilayer plastic film according to the invention, especially the multilayer plastic film treated by means of plasma or corona, has a coefficient of friction (COF) on metal of at most 0.55, in particular determined according to DIN 53375.

The coefficient of friction, also known as the coefficient of friction (or also as the coefficient of friction or COF), is a dimensionless measure of the frictional force in relation to a contact force between two bodies. The coefficient of friction is determined in accordance with DIN 53375 by pulling a test weight covered with plastic film over a surface, in this case metal, measuring the force at which the test weight starts to move (static friction) and also measuring the force required to keep the test weight moving (dynamic friction).

Furthermore, the multilayer plastic film according to the invention should have a number of barrier properties, in particular so that it is suitable for use as a packaging film for moisture-sensitive and/or odor-intensive products or substances, or meets the requirement for use as such a packaging film.

Typically, the multilayer plastic film according to the invention has a water vapor permeability at 23° C. and 85% relative humidity of not more than 1 g/m²*d, in particular of not more than 0.8 g/m²*d, preferably of not more than 0.7 g/m²*d, particularly preferably of not more than 0.6 g/m²*d, most preferably of not more than 0.5 g/m²*d, in particular determined according to DIN EN ISO 15106.

Advantageously, the multilayer plastic film according to the invention has a water vapor permeability at 38° C. and 90% relative humidity of not more than 1.5 g/m²*d, in particular of not more than 1.3 g/m²*d, preferably of not more than 1.2 g/m²*d, particularly preferably of not more than 1.1 g/m²*d, very particularly preferably of not more than 1 g/m²*d, in particular determined according to DIN EN ISO 15106.

Water vapor permeability or water vapor diffusivity refers to the permeability of a coating or film to water vapor, whereby the higher the water vapor permeability, the better moisture can be transported. Water vapor permeability is particularly an important factor in the packaging of moisture-sensitive products.

Preferably, the multilayer plastic film according to the invention has an oxygen permeability at 23° C. and 50% relative humidity of at most 50 cm³/m²*d*bar, in particular of at most 48 cm³/m²*d*bar, preferably of at most 45 cm³/m²*d*bar, particularly preferably of at most 43 cm³/m²*d*bar, most preferably of at most 40 cm³/m²*d*bar, in particular determined according to DIN EN ISO 53380.

The gas permeability, in particular oxygen permeability, determines the property of the film to be penetrated by gas molecules, in particular oxygen molecules.

In particular, it is also an object of the present invention according to this aspect of the invention to provide a multilayer plastic film, in particular multilayer plastic composite film, preferably multilayer plastic packaging film, based on plastic recyclate (recycled plastic), in particular based on plastic recyclate derived from waste, and having barrier properties to water vapor and/or gases, preferably oxygen, preferably having barrier properties to water vapor and gases, preferably oxygen, in particular a multilayer plastic film as defined above,
  wherein the multilayer plastic film comprises a layer composite of several, in particular at least three, interconnected layers,
  wherein the multilayer plastic film and/or the layer composite comprises a first outer film (=carrier film) and a second outer film (=laminating or cover film) and a metal layer arranged between the first outer film and the second outer film,
  wherein the multilayer plastic film has a plastic recyclate content based on polyethylene (PE recyclate) of at least 80% by weight, based on the multilayer plastic film;
  wherein the outer films each comprise a layer composite of at least three film layers bonded to one another, in particular bonded and/or coextruded by means of coextrusion, wherein the outer films and/or the film layers each comprise a plastic recyclate based on polyethylene (PE recyclate); wherein the multilayer plastic film additionally comprises a bonding layer and/or an adhesive layer, the adhesive layer and/or adhesive layer being disposed between the metal layer and the second outer film; and
  wherein the metal layer is applied to the inner side of the first outer film and/or to the side of the first outer film facing the second outer film and/or is attached thereto, wherein the metal layer is formed with a layer thickness in the range of 0.001 μm to 50 μm, in particular in the range of 0.0015 μm to 35 μm, preferably in the range of 0,002 μm to 20 μm, particularly preferably in the range from 0.003 μm to 10 μm, and wherein the metal layer is formed as an aluminum layer and/or consists at least substantially of aluminum or is formed therefrom, in particular wherein the aluminum content of the metal layer, based on the metal layer, is at least 95 wt-%;
  where the multilayer plastic film has
    a water vapor permeability at 23° C. and 85% relative humidity of not more than 1 g/m²*d, determined in particular in accordance with DIN EN ISO 15106, a water vapor permeability at 38° C. and 90% relative humidity of not more than 1.5 g/m$^2$*d, determined in particular in accordance with DIN EN ISO 15106, and an oxygen permeability at 23° C. and 50% relative humidity of not more than 50 cm$^3$/m$^2$*d*bar, determined in particular in accordance with DIN EN ISO 53380.

Such a multilayer plastic film according to the invention, in particular with the defined barrier properties, is particularly suitable as a packaging film for moisture-sensitive and/or odor-intensive products.

The surface of the multilayer plastic film according to the invention can in particular be modified in further working steps or provided with further (film) layers (e.g. lacquering, wood gloss effects, printing, etc.). In the context of the present invention, for example, a sealant can be applied to protect the surface (for example, to make the surface impermeable to water).

Typically, the multilayer plastic film according to the invention can be designed to be sealable (sealable).

In particular, the multilayer plastic film according to the invention can be designed to be finishable.

Preferably, the multilayer plastic film according to the invention can be designed to be coatable.

Advantageously, the multilayer plastic film according to the invention can be designed to be printable, in particular printable on at least one of its outer film layers.

Preferably, the multilayer plastic film according to the invention can be formed rough and/or roughened, in particular on at least one of its outer films, preferably on at least one outer side of its outer films, rough and/or roughened, in particular by means of plasma or corona treatment.

Corona treatment is an electrochemical process for surface modification of plastics in which the plastic film is subjected to a high-voltage electrical discharge, thereby increasing the surface tension. This process can be carried out, for example, between a grounded, polished roll of steel or aluminum and a close-fitting insulated electrode, although insulated rolls and uninsulated electrodes can also be used. The plastic film rests on the polished roll so that only the side facing the electrode is treated, with the back side being co-treated if there is a surge of air between the roll and the plastic film. As an alternative to corona treatment, a plasma process or plasma treatment of the surface can also be used.

Furthermore, it may be provided in the context of the present invention that the multilayer plastic film according to the invention is printed, and/or provided with printing, on one of the outer films, in particular on the inside.

In this context, it may further be provided in the context of the present invention that the multilayer plastic film according to the invention is printed and/or provided with printing on the inner side of the second outer film and/or on the side of the second outer film facing the first outer film.

By printing the plastic film according to the invention on its inner side, in particular on the inner side of the second outer film, which should advantageously be transparent, the printing on the inner side is protected against wear and/or tear. The side of the corresponding outer film to be printed should in particular be pretreated by a corona or plasma treatment before printing in order to ensure reliable adhesion of the printing.

Furthermore, it may also be provided within the scope of the present invention that the multilayer plastic film according to the invention is provided and/or equipped with an identification means, preferably a marking, in particular an optically and/or electronically detectable identification means, a pattern, a lettering and/or a logo on one of the outer films, in particular on the inside.

The application of an identifier, a pattern, lettering and/or a logo enables the plastic film itself or also the goods packaged in the plastic film or the manufacturer of the goods packaged in the plastic film to be identified quickly and unambiguously. In this context, the printing can contain, for example, information regarding the origin, recyclability, (product) adhesion, ingredients, quality controls carried out, minimum shelf life, etc.

According to a particular embodiment of the present invention, the multilayer plastic film may be in the form of a flat film, tubular film or semi-tubular film.

According to another particular embodiment, the multilayer plastic film may be designed for use as packaging, in particular in the form of outer packaging, tubes, bags or pouches.

According to yet another particular embodiment, the multilayer plastic film may be designed for packaging bulk goods, in particular selected from the group of (planting) soils, fertilizers, mulches, humus, detergents, adhesives, pellets, granulates, powders, hygiene articles, household goods and household products, or else for hygiene applications.

Furthermore, the multilayer plastic film according to the invention can be designed for use in the non-food sector, in particular as packaging material.

According to a particular embodiment of the present invention, it may be provided that the multilayer plastic film, in particular the layer composite of the multilayer plastic film, comprises further layers. The further layers can in particular be selected from the group of additional and/or further film layers, adhesion-promoting layers, adhesive layers, cover layers, color layers, lacquers and combinations thereof.

By applying further layers, in particular further of the previously mentioned layers, the properties of the multilayer plastic film according to the invention can be further adjusted and tailored according to the application requirements.

In particular, in this context, the further layers are each formed from no other and/or further plastic recyclate, in particular from no other and/or further plastic grade according to DIN EN ISO 11469, with respect to the outer layers.

Furthermore, it is preferred if the further layers each have a plastic recyclate that is the same and/or similar in relation to the plastic forming the plastic recyclate, in particular in relation to the type of plastic forming the plastic recyclate according to DIN EN ISO 11469.

In addition, it is also preferred if the further layers each have an identical and/or similar type of plastic with respect to the plastic forming the plastic recyclate, in particular in accordance with DIN EN ISO 11469.

Since the possible further layers also have the same type of plastic as the plastic recyclate used, the plastic film according to the invention can still be recycled in this particular embodiment.

In the context of the present invention, it is preferred if the multilayer plastic film according to the invention is designed to be recyclable (recyclable) and/or recyclable.

Furthermore, it is also preferred in the context of the present invention if the multilayer plastic film according to the invention can be used after its use in the form of its plastic recyclate for the manufacture of plastic-based products.

In particular, this means that the plastic film based on recycled plastic can be reprocessed into recycled plastic after use and then into a new plastic-based product in accordance with the invention. This creates a sustainable and long-lasting recyclable material and economic cycle.

According to a particular embodiment, it may be provided that the multilayer plastic film and/or at least one outer film, preferably the first outer film, is opaque, in particular opaque with respect to the wavelength range of visible light.

As explained before, the term opacity generally refers to the opposite of transparency, i.e. lack of transparency or lack of permeability. For further details, please refer to the explanations above.

One advantage of an opaque plastic film, particularly when used as or for packaging films, is the fact that the goods contained therein, for example, are not recognizable or visible. Furthermore, the goods can be protected from UV radiation, which, for example, protects organic materials from germination, algae formation or mold growth.

In particular, it may be provided in this context that the multilayer plastic film and/or at least one outer film, preferably the first outer film, is opaque, in particular opaque with respect to the wavelength range of visible light, wherein the opaque multilayer plastic film and/or at least one outer film, preferably the first outer film, has an opacity of at least 60%, in particular of at least 70%, preferably of at least 80%, particularly preferably of at least 90%, very particularly preferably of at least 95%, even more preferably of at least 96%, in particular determined in accordance with DIN 53146.

According to this particular embodiment of the present invention, it may be provided that the opaque multilayer plastic film and/or the opaque at least one outer film, preferably the opaque first outer film, is colored.

In this context, "colored" means all available and/or possible colors, especially in the wavelength range of electromagnetic radiation from 380 nm to 780 nm, including the colors "white", "black" and "gray".

In particular, the opaque multilayer plastic film and/or the opaque at least one outer film, preferably the opaque first outer film, may comprise coloring ingredients, in particular selected from color pigments, dyes, colorants and combinations thereof.

Furthermore, according to this particular embodiment of the present invention, it may be provided that the opaque and/or colored multilayer plastic film and/or the opaque and/or colored at least one outer film, preferably the opaque and/or colored first outer film, has at least two mutually different colors and/or at least two mutually different coloring ingredients.

Furthermore, according to this particular embodiment of the present invention, it may be provided that at least two film layers of the opaque and/or colored multilayer plastic film and/or the opaque and/or colored at least one outer film, preferably the opaque and/or colored first outer film, have mutually different colors and/or mutually different coloring ingredients.

Also, according to this particular embodiment of the present invention, it may be provided that the opaque and/or colored multilayer plastic film and/or the opaque and/or colored at least one outer film, preferably the opaque and/or colored first outer film, has white, silver and/or black color pigments.

Suitable color pigments are well known to the skilled person, and in this connection, for example, inorganic white pigment, in particular selected from the group of titanium dioxide, lithopones, barium sulfate, zinc oxide, zinc sulfide, lead carbonate, aluminum oxide, silicon dioxide, calcium carbonate, lead white, cristobaltine, kaolin, Kremser white, marien glass, calcium aluminate sulfate, clay, antimony white and combinations thereof, can be used as white pigment; metal effect pigments, such as silver color pigment, can be used in particular as metal colors; and inorganic metal effect pigments, in particular inorganic silver color pigment, or an inorganic black pigment, preferably a metal effect pigment, can be used in particular as black pigment.

In particular, the opaque and/or colored multilayer plastic film and/or the opaque and/or colored at least one outer film, preferably the opaque and/or colored first outer film, may contain at least one stabilizer, in particular a UV stabilizer.

Typically, the opaque and/or colored multilayer plastic film and/or the opaque and/or colored at least one outer film, preferably the opaque and/or colored first outer film, contains at least one stabilizer, in particular a UV stabilizer, preferably in amounts in the range of 0.01 to 5% by weight, preferably 0.1 to 3% by weight, based on the multilayer plastic film and/or the at least one outer film.

According to an alternative embodiment, it may be provided that the multilayer plastic film and/or at least one outer film, preferably the second outer film, is transparent, in particular transparent with respect to the wavelength range of visible light.

In this context, "transparent" refers to translucency or transmittance; in particular, transparent plastic films are transparent with respect to the wavelength range of visible light. The wavelength range of visible light refers in particular to electromagnetic radiation in the wavelength range from 350 nm to 780 nm.

In physics, transparency refers in particular to the ability of matter to allow electromagnetic waves to pass through (transmission). In general, the term is usually used to refer to visible light, i.e. to the spectral range of electromagnetic radiation that is visible to humans. Transparency is therefore an optical property of a material; other optical properties are, for example, reflectivity and absorptivity.

A significant advantage of a transparent plastic film according to the invention, especially when used as or for packaging films, is the fact that, for example, the goods contained therein are recognizable or visible, which can be used for quality control, for example.

As previously stated, according to this alternative particular embodiment, the multilayer plastic film and/or at least one outer film, preferably the second outer film, may be transparent, in particular transparent with respect to the wavelength range of visible light.

In particular, it can be provided in this context that the transparently formed multilayer plastic film and/or the transparently formed at least one outer film, preferably the transparently formed second outer film, has a transparency of at least 70%, in particular of at least 75%, preferably of at least 80%, particularly preferably of at least 85%, very particularly preferably of at least 90%, even more preferably of at least 95%, in particular determined in accordance with DIN EN ISO 13468.

Transparency in this context is the measure of light transmission in percent and is thus the reciprocal of opacity. In particular, the transparency of a completely translucent plastic film is 100%, and a completely opaque plastic film has a transparency of 0% (i.e. 100% opacity).

Also, according to this particular embodiment of the present invention, it may be provided that the transparently formed multilayer plastic film and/or the transparently formed at least one outer film, preferably the transparently formed second outer film, has an opacity of at most 30%, in particular of at most 25%, preferably of at most 20%, particularly preferably of at most 15%, very particularly preferably of at most 10%, even more preferably of at most 5%, in particular determined according to DIN 53146.

Furthermore, it may also be provided that the transparently formed multilayer plastic film and/or the transparently formed at least one outer film, preferably the transparently formed second outer film, has a haze value of at most 30%, in particular of at most 25%, preferably of at most 20%, particularly preferably of at most 15%, very particularly preferably of at most 10%, even more preferably of at most 5%, in particular determined in accordance with ASTM D-1003.

In this context, the haze value is in particular a measure of the opacity of transparent samples or plastic films and describes the proportion of transmitted light that is scattered forward by the irradiated sample or plastic film; i.e. the haze value quantifies material defects in the surface or structure that interfere with clear visibility.

According to this particular embodiment of the present invention, it may furthermore be provided that the transparently formed multilayer plastic film and/or the transparently formed at least one outer film, preferably the transparently formed second outer film, contains primary plastic(s) of the same plastic grade according to DIN EN ISO 11469 as the plastic recyclate, in particular in amounts in the range from 0.1% by weight to 15% by weight, preferably in amounts in the range from 0.5% by weight to 10% by weight, preferably in amounts in the range from 1% by weight to 9% by weight, based on the multilayer plastic film and/or the at least one outer film.

In the context of the present invention, it is particularly preferred if the first outer film is opaque, in particular wherein the first outer film has white, silver and/or black color pigments, and the second outer film is transparent.

In particular, it is also an object of the present invention according to this aspect of the invention to provide a multilayer plastic film, in particular multilayer plastic composite film, preferably multilayer plastic packaging film, based on plastic recyclate (recycled plastic), in particular based on plastic recyclate derived from waste, and having barrier properties to water vapor and/or gases, preferably oxygen, preferably having barrier properties to water vapor and gases, preferably oxygen, in particular a multilayer plastic film as defined above, wherein the multilayer plastic film comprises a laminate of multiple, in particular at least three, layers bonded together, wherein the multilayer plastic film and/or the layer composite comprises a first outer film (=carrier film) and a second outer film (=laminating or cover film) and a metal layer arranged between the first outer film and the second outer film, wherein the multilayer plastic film has a plastic recyclate content of at least 80% by weight, based on the multilayer plastic film, wherein the outer films each comprise a layer composite of at least three film layers bonded to one another, in particular bonded and/or coextruded by means of coextrusion, wherein the first outer film is opaque, in particular wherein the first outer film has white, silver and/or black color pigments, and the second outer film is transparent; and wherein the metal layer is applied to the inner side of the first outer film and/or to the side of the first outer film facing the second outer film and/or is attached thereto, wherein the metal layer is formed with a layer thickness in the range of 0.001 μm to 50 μm, in particular in the range of 0.0015 μm to 35 μm, preferably in the range of 0,002 μm to 20 μm, particularly preferably in the range from 0.003 μm to 10 μm, and wherein the metal layer is formed as an aluminum layer and/or consists at least substantially of aluminum or is formed therefrom, preferably wherein the aluminum content of the metal layer, based on the metal layer, is at least 95% by weight, particularly at least 96% by weight, in particular at least 96% by weight, preferably at least 97% by weight, particularly preferably at least 98% by weight, very particularly preferably at least 99% by weight.

Furthermore, it is in particular also an object of the present invention according to this aspect of the invention to provide a multilayer plastic film, in particular multilayer plastic composite film, preferably multilayer plastic packaging film, based on plastic recyclate (recycled plastic), in particular based on plastic recyclate originating from waste, and having barrier layer properties (barrier properties) to water vapor and/or gases, preferably oxygen, preferably having barrier layer properties (barrier properties) to water vapor and gases, preferably oxygen, in particular a multilayer plastic film as defined above, wherein the multilayer plastic film comprises a laminate of multiple, in particular at least three, layers bonded together, wherein the multilayer plastic film and/or the layered composite comprises a first outer film (=carrier film) and a second outer film (=laminating or cover film) and a metal layer arranged between the first outer film and the second outer film, wherein the multilayer plastic film has a plastic recyclate content based on polyethylene (PE recyclate) of at least 80% by weight, based on the multilayer plastic film;

wherein the outer films each comprise a layer composite of at least three film layers bonded to one another, in particular bonded and/or coextruded by means of coextrusion, wherein the outer films and/or the film layers each comprise a plastic recyclate based on polyethylene (PE recyclate), and wherein the first outer film is opaque, in particular wherein the first outer film comprises white, silver and/or black color pigments, and the second outer film is transparent;

wherein the multilayer plastic film additionally comprises a bonding layer and/or an adhesive layer, the bonding layer and/or adhesive layer being disposed between the metal layer and the second outer film; and wherein the metal layer is applied to the inner side of the first outer film and/or to the side of the first outer film facing the second outer film and/or is attached thereto, wherein the metal layer is formed with a layer thickness in the range of 0.001 μm to 50 μm, in particular in the range of 0.0015 μm to 35 μm, preferably in the range of 0,002 μm to 20 μm, particularly preferably in the range from 0.003 μm to 10 μm, and wherein the metal layer is formed as an aluminum layer and/or consists at least substantially of aluminum or is formed therefrom, in particular wherein the aluminum content of the metal layer, based on the metal layer, is at least 95 wt.-%;

where the multilayer plastic film has
a water vapor permeability at 23° C. and 85% relative humidity of not more than 1 g/m$^2$*d, determined in particular in accordance with DIN EN ISO 15106,
a water vapor permeability at 38° C. and 90% relative humidity of not more than 1.5 g/m$^2$*d, determined in particular in accordance with DIN EN ISO 15106, and an oxygen permeability at 23° C. and 50% relative humidity of not more than 50 $cm^3/m^2*d*bar$, determined in particular in accordance with DIN EN ISO 53380.

For the production of the multilayer plastic film according to the invention, plastic recyclate or recycled plastic is used, which is based on plastic waste. Obtaining a plastic recyclate suitable for producing the multilayer plastic film according to the invention can be done, for example, as follows:

First, the plastic waste is pre-sorted in the household by the consumer, especially in Germany in connection with the "Green Dot" waste collection and recycling system, according to which the plastic waste is collected in the yellow bag or the yellow garbage can or disposed of by the consumer. Subsequently, this plastic waste pre-sorted by the consumer in the household enters a sorting plant, which, preferably automatically, separates the plastic waste in a multi-stage process. First, the waste is sorted by size to simplify the further separation process. Then, for example, light materials such as films are sorted out in an air classifier so that the subsequent further sorting of the hard plastic can be carried out according to the corresponding plastic grade (i.e. plastic grade according to DIN EN ISO 11469). For this purpose, the hard plastic can be sorted step by step by a scanner, e.g. a near-infrared scanner, according to plastic type (i.e. for example PE, PP, PET, etc.) in a next step, whereby subsequent manual sorting can take place after the automatic sorting. Further sorting, e.g. by density or color, can also be carried out. The at least substantially unmixed plastic waste obtained in this way is usually crushed, in particular shredded, in a next step and then typically subjected to cleaning (usually washing) with subsequent drying. This at least essentially unmixed, shredded and cleaned plastic waste can then also be subjected to further sorting according to its type of plastic, optionally followed by a preferably automatic color sorting (if color sorting has not already been carried out beforehand, e.g. before shredding or after cleaning, etc.). The shredded and cleaned plastic waste, which is now at least essentially unmixed, in particular also in terms of color, is melted in an extruder, for example, then subjected to final cleaning by means of a filter and processed into granules. This granulate finally obtained corresponds to the plastic recyclate used in the context of the present invention.

The production of the multilayer plastic film according to the invention based on such a plastic recyclate can be carried out, for example, as follows:

First, the plastic recyclate is melted, for example in an extruder, with possible or optional further ingredients being added to the resulting melt, such as stabilizers, colorants or color pigments, primary plastics, anti-adhesive agents, etc. The resulting melt is then pressed out continuously, preferably under pressure, from a shaping opening or die. This resulting melt is then continuously pressed out of a shaping opening or nozzle, preferably under pressure. Preferably, the so-called blown film extrusion is suitable for producing the multilayer plastic film according to the invention, in particular a corresponding film tube, in which the melt emerges from an annular die (from which the individual film layers emerge directly as a coextrudate and thus already as a film layer composite) in the form of a coextruded multilayer film tube and is generally discharged upwards.

Since, according to the invention, the film is a multilayer plastic film, also called a coex(trusion) film, melts from several extruders are fed to the blow molding process, which are combined, in particular co-extruded, into a common film via a multilayer ring die. According to this technique, both tubular films and, in turn, semi-tubular films as well as flat films can be produced from them (by cutting open the tubular film), although the special design of the die may vary depending on the film to be produced (i.e. flat, tubular or semi-tubular film). Alternatively, especially in the case of multilayer flat films, slit-shaped outlet nozzles, in particular slit-shaped multilayer outlet nozzles, can also be used; also, (although less preferred according to the invention) in the case of multilayer flat films, the individual layers can first be extruded separately and subsequently laminated. The layer thickness of the multilayer plastic films produced can be varied by a large number of manufacturing parameters, for example by the extrusion pressure, the die shape and die slot size, the amount of air introduced during blown film extrusion, the amount of granules, the discharge or haul-off speed applied during extrusion, squeeze off pressure, etc.

The first outer film (carrier film) on the one hand and the second outer film (laminating or cover film) on the other hand of the multilayer plastic film according to the invention can be produced in the manner described above. Preferably, both outer films are each produced as multilayer, in particular three-layer, coextruded composite films, preferably each as a flat film. By optional addition of coloring substances, as described above, one of the two outer films can be made colored or opaque, while the other outer film, on the other hand, can be made transparent or equally colored or opaque.

The coextruded multilayer flat film to be used as the first outer film (carrier film) can be pretreated or roughened on one of its outer sides by means of corona or plasma treatment, followed by metallization, typically with aluminum, preferably by means of vapor deposition (as described previously). The metallized outer side of the first outer film is typically arranged on the inside (i.e. facing the second outer film) in the overall laminate of the multilayer plastic film according to the invention.

By means of a suitable adhesive or bonding agent, in particular a reactive adhesive or bonding agent (preferably a reactive polyurethane adhesive), which can be applied over the entire surface to an outer side of the second outer film (namely that outer side which is typically arranged on the inside, i.e. facing the first outer film, in the overall laminate of the multilayer plastic film according to the invention). If printing is desired, this is preferably applied to this outer side before application of the adhesive or bonding agent, in order to protect the printing against wear and/or damage when the plastic film according to the invention is in use.

The second outer film is then laminated to the first outer film via the metal layer of the first outer film while the adhesive or bonding agent is still in a reactive state, resulting in a stable multilayer composite, i.e. in the end a multilayer plastic film according to the present invention.

The previously described production of a multilayer plastic film according to the present invention is described purely by way of example and is not limiting with respect to a typical embodiment.

The production of multilayer plastic films by means of extrusion, in particular coextrusion, as described above in its main features, is sufficiently known to the skilled person as such or per se (as is the metallization of plastic films as such), so that reference can be made to the general technical knowledge with regard to further relevant details.

A further object of the present invention—according to a second aspect of the present invention—is to use a multilayer plastic film, as previously defined, for the production of packaging material and/or as packaging material.

In particular, according to this aspect of the present invention, it is preferred that the multilayer plastic film be in the form of a flat film, tubular film or semi-tubular film.

Further, according to a particular embodiment according to this aspect of the present invention, it may be provided that the multilayer plastic film is used in the form of outer packaging, tubes, bags or pouches.

According to a preferred embodiment according to this aspect of the invention, it is envisaged that the multilayer plastic film according to the invention is processed via automated filling and/or packaging equipment (e.g. FFS or VFFS equipment), preferably as so-called rollstock, in particular into the desired final packaging.

In the context of the use according to the invention, the multilayer plastic film according to the invention is preferably used as a so-called PCR plastic film.

Furthermore, according to another particular embodiment of this aspect of the present invention, it may be envisaged that the multilayer plastic film is used for packaging bulk materials, in particular selected from the group of (planting) soils, fertilizers, mulches, humus, detergents, adhesives, pellets, granules, powders, hygiene products, household goods and household products, or else for hygiene applications.

In accordance with this aspect of the present invention, it may be particularly envisaged that the multilayer plastic film is used for packaging purposes and/or as a packaging material in the non-food sector.

With respect to further details of the use of a multilayer plastic film according to the invention, reference is made to the foregoing explanations with respect to the multilayer plastic film according to the invention, which also apply accordingly to this aspect of the present invention.

Furthermore, it is also an object of the present invention—according to a third aspect of the present invention—to provide a packaging material comprising at least one multilayer plastic film as previously defined.

In particular, according to this aspect of the present invention, it is preferred if the packaging material and/or the multilayer plastic film is/are in the form of outer packaging, tubes, bags or pouches.

According to a particular embodiment of this aspect of the invention, it may be provided in particular that the packaging material and/or the multilayer plastic film is/are designed for packaging bulk goods, in particular selected from the group of (planting) soils, fertilizers, mulches, humus, detergents, adhesives, pellets, granulates, powders, hygiene products, household goods and household products, or else for hygiene applications.

According to a further particular embodiment of this aspect of the invention, it may equally be provided that the packaging material and/or the multilayer plastic film is/are designed for packaging purposes and/or as packaging material in the non-food sector.

With respect to further details of the packaging material according to the invention, reference is made to the foregoing explanations with respect to the multilayer plastic film according to the invention and its use, which also apply accordingly to this aspect of the present invention.

The present invention is illustrated with reference to the following embodiments, which are not intended to limit the present invention in any way, but merely to explain exemplary and non-limiting methods of implementation and embodiments of the present invention.

Figure 2:
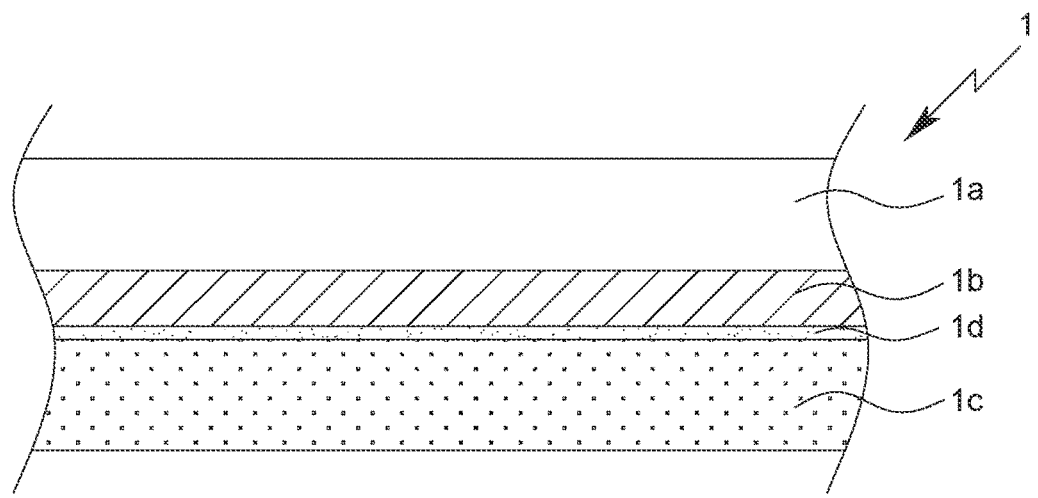
FIG. 2 provides a schematic cross-sectional view of a multilayer plastic film according to a further particular embodiment of the present invention, in which the two outer films are each formed as a single layer and an additional adhesive layer is provided.
Figure 3:
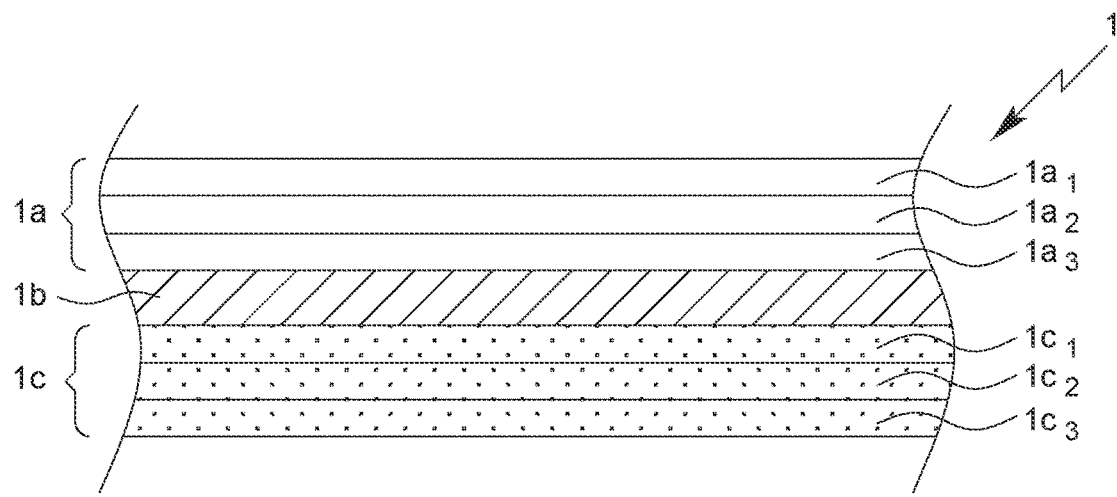
FIG. 3 provides a schematic cross-sectional view of a multilayer plastic film according to yet another particular embodiment of the present invention, in which the two outer films each have a three-layer or triple-layer structure.

In the following, the invention is explained in more detail by means of figures representing only typical embodiments.
In the figure illustration shows:

FIG. 1 a schematic cross-sectional view of a multilayer plastic film according to a particular embodiment of the present invention, in which the two outer films are each single-layered or single-layered;

FIG. 2 a schematic cross-sectional view of a multilayer plastic film according to a further particular embodiment of the present invention, in which the two outer films are each formed as a single layer and an additional adhesive layer is provided;

FIG. 3 a schematic cross-sectional view of a multilayer plastic film according to yet another particular embodiment of the present invention, in which the two outer films each have a three-layer or triple-layer structure.

In the following, the invention is explained in more detail by means of three figure representations (FIGS. 1 to 3). The figures each show different schematic cross-sectional representations of various multilayer plastic films according to particular embodiments of the present invention.

FIG. 1 shows a multilayer plastic film 1 according to a particular embodiment of the present invention, wherein the plastic film 1 comprises a layer composite of three interconnected layers 1a, 1b, 1c, wherein the plastic film 1 or the layer composite comprises a first outer film 1a and a second outer film 1c, as well as a metal layer 1b arranged between the first outer film 1a and the second outer film 1c. FIG. 1 also shows that the two outer films 1a, 1c each have a higher layer thickness relative to the metal layer 1b, respectively. Typically, the metal layer 1b is applied to the inner side of one of the two outer films 1a, 1c by means of vapor deposition, as previously described, and is bonded or glued to the respective other outer film 1a, 1c via its inner side.

Furthermore, FIG. 2 shows a multilayer plastic film 1 according to a further particular embodiment of the present invention, wherein the plastic film 1 comprises a layer composite of four interconnected layers 1a, 1b, 1c, 1d, wherein the plastic film 1 or the layer composite comprises a first outer layer 1a and a second outer layer 1c, wherein a metal layer 1b and an adhesive layer (glue layer) 1d are arranged between the outer layers 1a and 1c. In this regard, the metal layer 1b is applied to or attached to the inner side of the first outer film 1a or the side of the first outer film 1a facing the second outer film 1c, and the adhesive layer 1d is applied to or attached to the inner side of the second outer film 1c or the side of the second outer film 1c facing the first outer film 1a. The first outer film 1a is bonded or laminated to the second outer film 1c via its metal layer 1b by means of the adhesive layer 1d.

It goes without saying that also in this embodiment, the outer films 1a, 1c can each be formed as multilayer, in particular three-layer, coextruded films (not shown), as explicitly shown in FIG. 3 described below and also described in further detail in the embodiment examples.

Such a laminate or multilayer plastic film, as shown in FIG. 2, results in a particularly stable and hard-wearing laminate.

Furthermore, FIG. 3 shows a multilayer plastic film 1 according to yet another particular embodiment of the present invention, wherein the plastic film 1 comprises a layer composite of three interconnected layers 1a, 1b, 1c, wherein the plastic film 1 resp. the layer composite comprises a first outer layer 1a and a second outer layer 1c and a metal layer 1b arranged between the first outer layer 1a and the second outer layer 1c, and wherein the outer films 1a, 1c each comprise a layer composite of three interconnected film layers $1a_1$, $1a_2$, $1a_3$, $1c_1$, $1c_2$, $1c_3$. In total, the plastic film 1 according to FIG. 3 thus has seven layers, with the outer three film layers in each case constituting an outer film. The use of outer films 1a, 1c, which themselves each comprise a layer composite of three interconnected film layers $1a, 1a_2$, $1a_3$, $1c_1$, $1c_2$, $1c_3$, enables specific and application related tailoring of the plastic film 1 to its corresponding application; in particular, the properties of the outer films $1a$, $1c$ can already be tailored.

It goes without saying that in this embodiment, too, the outer films $1a$, $1c$, in particular the metal layer $1b$ and the second outer film $1c$, can be bonded to each other by means of an adhesive layer (not shown). In this respect, however, reference can be made in principle to the above figure description for FIG. 2.

For further details, please refer to the above explanations, which apply accordingly to the figure illustrations.

Further embodiments, modifications and variations of the present invention are readily apparent or realizable to those skilled in the art upon reading the description without departing from the scope of the present invention.

The present invention is illustrated with reference to the following embodiments, which are not intended to limit the present invention in any way, but merely to explain exemplary and non-limiting methods of implementation and embodiments of the present invention.

EXAMPLES

Abbreviations Used

PE recyclate: Plastic recyclate based on polyethylene, in particular with a grade purity of at least 90 wt %.
Primary PE: polyethylene newly produced from fossil raw materials
AMF 715: Lubricant; POLYBATCH® AMF 715 HF-IP, Company A Schulman/LyondellBasell
white 8750 ES: white color; POLYWHITE® 8570 ES, Company A Schulman/LyondellBasell
silver 7030: silver color; POLYBATCH® 7030, company A. Schulman/LyondellBasell
black 2723 black color; POLYBLACK® 2723 Pm, company A Schulman/LyondellBasell
UV stabilizer: POLYBATCH® UV 1952, Company A Schulman/LyondellBasell
Adhesive/Adhesive: Two-component polyurethane adhesive; Purbinder MP 985, Bostik Company.

Production of Plastic Films According to the Invention

For the production of multilayer plastic films according to the present invention (i.e., PCR plastic films) with a plastic recyclate content of at least 80% by weight in each case, based on the plastic film, according to particular embodiments of the present invention, wherein the outer films are each three-layer coextruded plastic films and an aluminum layer is present between the two outer films, the following procedure is used:

In a manner previously disclosed in the context of the description, PE type-pure, shredded and cleaned PE plastic waste is first processed and obtained (PE type purity within the meaning of DIN EN ISO 11469 of at least 95% by weight, based on the PE plastic waste), which is subsequently processed in a manner known per se into a polyethylene-based plastic recyclate in the form of a granulate (PE recyclate with PE type purity a 95% by weight, based on the PE recyclate).

This granular PE recyclate (polyethylene-based PCR plastic recyclate) is then extruded into the corresponding three-layer outer films in the form of PE recyclate films (polyethylene-based PCR plastic recyclate) by adding further desired ingredients (e.g. stabilizers, in particular UV stabilizers, color pigments and optionally also lubricants in the case of opaque or colored plastic films or primary polyethylene and non-stick agents in the case of transparent plastic films, etc.).) are processed in a manner known per se and previously disclosed in the description by means of blown film extrusion using a multilayer ring die to form the corresponding three-layer outer films in the form of PE recyclate films (PEReclate content or PCR content based on PE in each case ≥80% by weight, based on the plastic film). The tubular films obtained are further processed into flat films in a manner known per se.

The three-layer plastic film for the first outer film layer (=carrier film; i.e. film $1a$ in the figures) is made opaque by the addition of appropriate color pigments, in particular white, silver or black (cf. further explanations below); the inside of the carrier film is then subjected to a corona or plasma treatment to ensure subsequent adhesion of the metal layer.

The opaque 3-layer carrier film has the following schematized structure:
  first outer film layer (PE) (colored white)/middle film layer (PE) (colored white)/second outer film layer (PE) (colored silver or black)

The three-layer plastic film for the second outer film layer (=laminating or cover film; i.e., film $1c$ in the figures), on the other hand, is transparent (cf. the following explanations); the inside of the laminating or cover film is then subjected to a corona or plasma treatment to ensure subsequent printing or adhesion of a print.

The transparent 3-layer laminating film has the following schematized structure:
  first outer film layer (PE) (transparent)/middle film layer (PE) (transparent)/second outer film layer (PE) (transparent)

Subsequently, a thin aluminum layer (e.g. 5 µm; metal layer $1b$ in the figures) is applied by thin-film technology, namely by means of gas phase deposition, to the inside of the first outer film (carrier film) previously treated by corona or plasma treatment (cf. metallization or vacuum coating in an oxygen-free atmosphere, e.g. in accordance with the principle according to EP 1 936 004 B1); this results in a metallized three-layer carrier film.

Furthermore, the inside of the second outer film, previously treated by corona or plasma treatment, is printed (e.g. color printing with product name of the product to be packaged).

Subsequently, the first outer film and the second outer film are then bonded or laminated to each other over their entire surface via their respective inner sides by means of a suitable bonding agent or adhesive (here: reactive polyurethane adhesive, e.g. Purbinder MP 985 from Bostik), so that the first outer film is bonded or laminated to the printed inner side of the second outer film over its entire surface via its metal layer by means of the adhesive layer. For this purpose, the adhesive, which has not yet reacted or is active, can first be applied (e.g. by means of squeegees, spraying, etc.) to the inside of the printed second outer film (i.e. to the printing) and then the first outer film (i.e. the metallized or aluminized first outer film) can be made to adhere thereto with its metal layer.

The result is an intimate multilayer film composite according to the present invention with the following schematized structure:
  opaque 3-layer carrier film/metal layer/adhesive layer/printing/transparent 3-layer laminating film When used for packaging purposes, the opaque 3-layer liner film forms the inside of the package, which is in contact with the product being packaged, whereas the transparent 3-layer laminating film forms the outside of the package.

The multilayer plastic films obtained in this way according to the present invention and their composition and properties are described below. Due to their high environmental compatibility, in particular due to the high PE recycle content of: 80% in each case, the plastic films according to the invention can be labeled and advertised accordingly when they are used (e.g. in Germany with the "Blue Angel" environmental label).

Plastic films according to the invention are produced with film thicknesses in the range from 30 μm to 150 μm.

1. Transparent Flat Film (=Laminating or Cover Film)

In the process described above, a transparent 3-layer flat film for use as a second outer film (=laminating or cover film) with a total layer thickness of 40 μm is first produced with the composition described in Table 1. The flat film has a ratio of the layer thicknesses of first outer film layer/middle film layer/second outer film layer of 10:20:10.

TABLE 1

Composition of the layers of a transparent flat film according to the invention (second outer film = laminating or cover film)

| Raw material | first outer film layer | Middle film layer | second outer film layer |
|---|---|---|---|
| PE recyclate | 90.5% | 91.0% | 90.5% |
| Primary PE | 9.0% | 9.0% | 9.0% |
| AMF 715 | 0.5% | — | 0.5% |

2.1 White/White/Silver Flat Film (Opaque Film=Carrier Film)

As part of the process described above, an opaque 3-layer plastic film with a white first outer film layer and a silver second outer film layer and a white middle film layer for use as a first outer film (=carrier film) with a total film thickness of 80 μm is also produced with the composition described in Table 2. The flat film has a ratio of the layer thicknesses of first outer film layer/middle film layer/second outer film layer of 22.4:40:17.6.

TABLE 2

Composition of the layers of a white/white/silver flat film according to the invention (first outer film = carrier film)

| Raw material | first outer film layer | Middle film layer | second outer film layer |
|---|---|---|---|
| PE recyclate | 93.0% | 88.0% | 88.0% |
| white 8750 ES | 5.0% | 10.0% | — |
| silver 7030 | — | — | 10.0% |
| UV stabilizer | 2.0% | 2.0% | 2.0% |

2.2. White/White/Black Flat Film (Opaque Film=Carrier Film)

As part of the process described above, an opaque 3-layer plastic film—with a white first outer film layer and a black second outer film layer and a white middle film layer for use as a first outer film (=carrier film) with a total layer thickness of 80 μm is also produced with the composition described in Table 3. The flat film has a ratio of the layer thicknesses of first outer film layer/middle film layer/second outer film layer of 22.4:40:17.6.

TABLE 3

Composition of the layers of a white/white/black flat film according to the invention (first outer film = carrier film)

| Raw material | first outer film layer | Middle film layer | second outer film layer |
|---|---|---|---|
| PE recyclate | 93.0% | 88.0% | 88.0% |
| white 8750 ES | 5.0% | 10.0% | — |
| black 2723 | — | — | 10.0% |
| UV stabilizer | 2.0% | 2.0% | 2.0% |

3. Metallization (Applying the Metal Layer) and Printing

The opaque 3-layer film (=first outer film or carrier film) is then roughened on its inside (i.e. on the silver or black film layer) by corona treatment (alternatively by plasma treatment). A thin aluminum layer (metallization) with a thickness of around 5 μm is applied to this roughened surface by means of vapor deposition (see above).

Secondly, the transparent 3-layer film (second outer film or laminating/covering film) is roughened by means of corona treatment (alternatively plasma treatment). This roughened surface is then printed.

4. Bringing Together/Laminating or Bonding the Outer Films

For bonding or laminating (i.e. bringing or joining together) the metallized first outer film and the printed second outer film, adhesive is applied to the printing on the second outer film; the metallized first outer film with the metal layer is then placed on the printed second outer film, which has been provided with adhesive (reactive PUR adhesive), and laminated with this. A total adhesive quantity of approx. 2.5 g/m² is used. After storage at room temperature for five days, the adhesive is fully cured.

Mechanical, Optical and Barrier Properties

The mechanical properties, especially the tensile strength in longitudinal and transverse direction, the elongation at break in longitudinal and transverse direction, the dynamic puncture resistance as well as the coefficients of friction of the untreated and the roughened films, of the produced multilayer plastic films are tested. In addition, the optical density of the multilayer plastic films is measured. Furthermore, the barrier properties of the manufactured multilayer plastic films against water vapor and oxygen are measured.

In this context, the following test procedures are used to measure the properties:

Tensile strength: Tensile test according to EN ISO 527

Elongation at break: tensile test according to EN ISO 527

Dynamic puncture resistance: Dart drop test according to ASTM D 1709

Coefficients of friction: Friction test on metal according to DIN 53375, with any necessary roughening of the films by means of corona treatment Optical density according to JIS-K7605

Opacity: Opacity measurement according to DIN 53146

Oxygen permeability according to DIN 53380

Water vapor permeability according to DIN EN ISO 15106

The multilayer plastic films produced meet all the required minimum standards:

| Mechanical property | Minimum requirements |
|---|---|
| Tensile strength in longitudinal direction | 19 N/mm$^2$ |
| Tensile strength in transverse direction | 17 N/mm2 |
| Elongation at break in longitudinal direction | 200% |
| Elongation at break in transverse direction | 250% |
| dynamic puncture resistance | 1.7 g/μm |
| Transparency (only for transparent films) | 85% |
| Optical density | 2 to 3 |

Furthermore, according to the requirements for use as packaging film, the produced and untreated multilayer plastic films have a coefficient of friction on metal of 0.45 or less. Furthermore, the produced multilayer plastic films after corona treatment, according to the requirements for use as packaging film, have a coefficient of friction on metal of 0.45 or less.

Also, in accordance with the requirements for use as packaging films of moisture-sensitive and/or odor-intensive goods, the multilayer plastic films produced have an oxygen permeability at 23° C. and 50% relative humidity of not more than 40 cm$^3$/m$^2$*d*bar, a water vapor permeability at 23° C. and 85% relative humidity of not more than 0.5 g/m$^2$*d and an oxygen permeability at 38° C. and 90% relative humidity of not more than 1 g/m$^2$*d.

Overall, the multilayer plastic films produced according to the invention thus meet the requirements for use as or in packaging materials, in particular for moisture-sensitive and/or odor-intensive goods. Furthermore, all plastic films have a plastic recyclate content of more than 80% by weight, based on the plastic film.

Despite the use of a high plastic recyclate content of over 80 wt. %, this results in high-performance multilayer PE films which also meet the requirements for use as packaging films and, moreover, as a result of the additional metallization (aluminum layer), continue to exhibit high barrier properties and also have excellent sealability.

LIST OF REFERENCE SIGNS 1 multilayer plastic film
1a first outer film (carrier film)
1b metal layer
1c second outer film (laminating film or cover film)
1d bonding layer and/or adhesive layer (adhesive layer)
$1a_1$, $1a_2$, $1a_3$ film layers of the first outer film 1a
$1c_1$, $1c_2$, $1c_3$ film layers of second outer film 1c

The invention claimed is:

1. A multilayer plastic composite film based on a plastic recyclate (recycled plastic) and having barrier layer properties to at least one of water vapor and gases,
wherein the multilayer plastic composite film comprises a layered composite of several layers bonded to one another, comprising a first outer film and a second outer film and a metal layer arranged between the first outer film and the second outer film;
wherein the multilayer plastic composite film has a plastic recyclate content of at least 80% by weight based on the multilayer plastic composite film;
wherein the multilayer plastic composite film comprises at least substantially only one single plastic grade according to DIN EN ISO 11469, said plastic grade having a grade purity of at least 90% by weight, based on the plastic content of the multilayer plastic composite film;
wherein the first outer film comprises a laminate of at least three film layers bonded to one another by means of coextrusion,
wherein the second outer film comprises a layer composite of at least three film layers bonded to one another by means of coextrusion or is in the form of a single-layer film, and
wherein the metal layer is applied to the inner side of the first outer film facing the second outer film and is attached thereto, wherein the metal layer is generated by means of metallization or thin-film techniques and has a layer thickness in the range from 0.001 μm to 50 μm.

2. The multilayer plastic composite film according to claim 1,
wherein the multilayer plastic composite film comprises only plastic recyclate of a single plastic grade.

3. The multilayer plastic composite film according to claim 1,
wherein the multilayer plastic composite film, apart from the plastic recyclate and the metal layer, comprises at least substantially only ingredients selected from the group consisting of fillers, colorants, color pigments, fragrances, anti-blocking agents, lubricants, stabilizers, plasticizers, binders, adhesives, primary or virgin plastics of the same plastic grade according to DIN EN ISO 11469 as the plastic recyclate, auxiliaries and additives as well as mixtures and combinations thereof.

4. The multilayer plastic composite film according to claim 1,
wherein the multilayer plastic composite film does not comprise any different or additional plastic recyclate.

5. The multilayer plastic composite film according to claim 1,
wherein the multilayer plastic composite film does not comprise any different or additional plastic grade.

6. The multilayer plastic composite film according to claim 1,
wherein the multilayer plastic composite film has a total plastic content in the range from 80% by weight to 99.95% by weight, based on the multilayer plastic composite film; and
wherein the multilayer plastic composite film has a metal content in the form of the metal layer in amounts in the range from 0.05% by weight to 20% by weight, based on the multilayer plastic composite film.

7. The multilayer plastic composite film according to claim 1,
wherein the multilayer plastic composite film comprises ingredients selected from the group consisting of fillers, colorants, color pigments, fragrances, anti-blocking agents, lubricants, stabilizers, plasticizers, binders, adhesives, primary or virgin plastics of the same plastic grade according to DIN EN ISO 11469 as the plastic recyclate, auxiliaries and additives as well as mixtures and combinations thereof in total amounts in the range of 0.1% by weight to 20% by weight, based on the multilayer plastic composite film.

8. The multilayer plastic composite film according to claim 1,
wherein the multilayer plastic composite film comprises or consists of:
plastic recyclate in amounts in the range from 80% by weight to 97% by weight, metal(s) in the form of the metal layer in amounts ranging from 0.05% by weight to 20% by weight, ingredients selected from the group consisting of fillers, colorants, color pigments, fragrances, anti-blocking agents, lubricants, stabilizers, plasticizers, binders, adhesives, primary or virgin plastics of the same plastic grade according to DIN EN ISO 11469 as the plastic recyclate, auxiliaries and additives as well as mixtures and combinations thereof in total amounts in the range of 0.1% by weight to 20% by weight, optionally primary or virgin plastic(s) of the same grade of plastic according to DIN EN ISO 11469 as the plastic recyclate, in amounts in the range from 0.1% by weight to 15% by weight, wherein all weight percentages are each related to the multilayer plastic composite film and are to be combined and/or selected such that 100% by weight results.

9. The multilayer plastic composite film according to claim 1,
wherein the multilayer plastic composite film has a layer thickness in the range from 10 µm to 300 µm.

10. The multilayer plastic composite film according to claim 1,
wherein the metal of the metal layer is selected from the group consisting of pure metals of one metal type, alloys of metals, mixtures of metals, metal compounds as well as combinations thereof.

11. The multilayer plastic composite film according to claim 1,
wherein the metal of the metal layer is aluminum.

12. The multilayer plastic composite film according to claim 1,
wherein the metal layer at least substantially consists of or is formed from aluminum wherein the aluminum content of the metal layer, based on the metal layer, is in the range from 95% by weight to 99% by weight.

13. The multilayer plastic composite film according to claim 1,
wherein the metal layer has a layer thickness in the range from 0.0015 µm to 35 µm.

14. The multilayer plastic composite film according to claim 1,
wherein the metal of the metal layer is present, relative to the multilayer plastic composite film, in amounts in the range from 0.05% by weight to 20% by weight.

15. The multilayer plastic composite film according to claim 1,
wherein the metal layer is formed as an at least substantially continuous and at least substantially full-surface layer.

16. The multilayer plastic composite film according to claim 1,
wherein the metal layer has barrier properties with respect to water vapor and gases.

17. The multilayer plastic composite film according to claim 1,
wherein the metal layer has been generated by means of vapor deposition or metallization.

18. The multilayer plastic composite film according to claim 1,
wherein the metal layer is opaque with respect to the wavelength range of visible light and has an opacity of at least 10% in accordance with DIN 53146 and wherein the metal layer has an optical density in the range from 1 to 5 in accordance with JIS K7605.

19. The multilayer plastic composite film according to claim 1,
wherein the summed layer thicknesses of the two outer films are 60% to 99.9% of the total layer thickness of the multilayer plastic composite film and wherein the ratio of the layer thicknesses of first outer film/metal layer/second outer film varies in the range of 50-90:0.5-20:30-60.

20. The multilayer plastic composite film according to claim 1,
wherein the multilayer plastic composite film is designed as a packaging material.

21. The multilayer plastic composite film according to claim 1,
wherein the multilayer plastic composite film is in the form of a flat film, a tubular film or a semi-tubular film.

22. The multilayer plastic composite film according to claim 1,
wherein the multilayer plastic composite film is in the form of outer packagings, tubes, bags or sachets.

23. The multilayer plastic composite film according to claim 1,
wherein the multilayer plastic composite film is designed as a packaging material in the non-food sector.

24. The multilayer plastic composite film according to claim 1,
wherein the multilayer plastic composite film is designed as a packaging material for packaging bulk goods selected from the group consisting of soils, fertilizers, mulch, humus, detergents, adhesives, pellets, granulates, household goods, household products and products for hygiene applications.

25. A multilayer plastic composite film based on a plastic recyclate (recycled plastic) and having barrier layer properties to at least one of water vapor and gases,
wherein the multilayer plastic composite film comprises a layered composite of several layers bonded to one another, comprising a first outer film and a second outer film and a metal layer arranged between the first outer film and the second outer film;
wherein the multilayer plastic composite film has a plastic recyclate content of at least 80% by weight based on the multilayer plastic composite film;
wherein the multilayer plastic composite film comprises at least substantially only one single plastic grade according to DIN EN ISO 11469, said plastic grade having a grade purity of at least 90% by weight, based on the plastic content of the multilayer plastic composite film;
wherein the first outer film comprises a laminate of at least three film layers bonded to one another by means of coextrusion,
wherein the second outer film comprises a layer composite of at least three film layers bonded to one another by means of coextrusion or is in the form of a single-layer film, and
wherein the metal layer is applied to the inner side of the first outer film facing the second outer film and is attached thereto, wherein the metal layer is generated by means of metallization or thin-film techniques and has a layer thickness in the range from 0.001 µm to 50 µm;
wherein the metal layer is present in a proportion in the range from 0.05% by weight to 20% by weight, relative to the multilayer plastic composite film, and
wherein the metal layer is formed as an aluminum layer.

26. A packaging material comprising at least one multilayer plastic composite film based on a plastic recyclate (recycled plastic) and having barrier layer properties to at least one of water vapor and gases,
- wherein the multilayer plastic composite film comprises a layered composite of several layers bonded to one another, comprising
- a first outer film and a second outer film and a metal layer arranged between the first outer film and the second outer film;
- wherein the multilayer plastic composite film has a plastic recyclate content of at least 80% by weight based on the multilayer plastic composite film;
- wherein the multilayer plastic composite film comprises at least substantially only one single plastic grade according to DIN EN ISO 11469, said plastic grade having a grade purity of at least 90% by weight, based on the plastic content of the multilayer plastic composite film;
- wherein the first outer film comprises a laminate of at least three film layers bonded to one another by means of coextrusion,
- wherein the second outer film comprises a layer composite of at least three film layers bonded to one another by means of coextrusion or is in the form of a single-layer film, and
- wherein the metal layer is applied to the inner side of the first outer film facing the second outer film and is attached thereto, wherein the metal layer is generated by means of metallization or thin-film techniques and has a layer thickness in the range from 0.001 µm to 50 µm.

* * * * *